(12) United States Patent
Kono et al.

(10) Patent No.: US 8,790,829 B2
(45) Date of Patent: Jul. 29, 2014

(54) NONAQUEOUS SECONDARY BATTERY

(75) Inventors: Satoshi Kono, Kyoto (JP); Masayuki Yamada, Kyoto (JP); Akira Inaba, Kyoto (JP); Kazutaka Matsuo, Kyoto (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 133 days.

(21) Appl. No.: 13/393,455

(22) PCT Filed: Sep. 8, 2011

(86) PCT No.: PCT/JP2011/070494
§ 371 (c)(1),
(2), (4) Date: Feb. 29, 2012

(87) PCT Pub. No.: WO2012/086273
PCT Pub. Date: Jun. 28, 2012

(65) Prior Publication Data
US 2012/0282524 A1 Nov. 8, 2012

(30) Foreign Application Priority Data
Dec. 20, 2010 (JP) ................................. 2010-282902

(51) Int. Cl.
*H01M 4/13* (2010.01)
(52) U.S. Cl.
USPC .......... 429/223; 429/218.1; 429/220; 429/224
(58) Field of Classification Search
None
See application file for complete search history.

(56) References Cited

U.S. PATENT DOCUMENTS

2003/0108790 A1* 6/2003 Manthiram et al. ....... 429/218.1
2003/0215711 A1 11/2003 Aramata et al.
(Continued)

FOREIGN PATENT DOCUMENTS

JP 59-020971 A 2/1984
JP 10-162830 A 6/1998
(Continued)

OTHER PUBLICATIONS

Lee et. al., Improvement of electrochemical and thermal properties of Li[Mi0.8Co0.1Mn0.1-x-yAlxMgy]O2 positive electrode materials by multiple metal (Al,Mg) substitution, Electrochimica Acta 54 (2009) 3851-3856.*

(Continued)

*Primary Examiner* — Cynthia K. Walls
(74) *Attorney, Agent, or Firm* — Birch, Stewart, Kolasch & Birch, LLP

(57) ABSTRACT

The present invention provides a nonaqueous secondary battery with a high capacity, an excellent level of safety, and excellent charge-discharge cycle characteristics. The negative electrode contains, as negative electrode active materials, a graphite carbon material and a material containing Si as a constituent element, and the positive electrode includes, as a positive electrode active material, a lithium-containing composite oxide represented by the following general composition formula (1) and containing sulfur in a range of 0.01 mass % to 0.5 mass %:

$$Li_{1+y}MO_2 \qquad (1)$$

where y satisfies $-0.3 \leq y < 0.3$, M represents a group of five or more elements including Ni, Co, Mn, Mg and at least one of Al, Ba, Sr, Ti and Zr, and when a, b, c and d represent Ni, Co, Mn, and Mg, respectively, in mol % and e represents a total of Al, Ba, Sr, Ti and Zr in mol % of all of the elements making up M, a, b, c, d, and e satisfy $70 \leq a \leq 97$, $0.5 < b < 30$, $0.5 < c < 30$, $0.5 < d < 30$, $-10 < c-d < 10$, $-8 \leq (c-d)/d \leq 8$, and $e < 10$.

7 Claims, 2 Drawing Sheets

(56) References Cited

U.S. PATENT DOCUMENTS

| | | |
|---|---|---|
| 2005/0233213 A1 | 10/2005 | Lee et al. |
| 2007/0190416 A1 | 8/2007 | Yamada et al. |
| 2007/0231691 A1 | 10/2007 | Abe et al. |
| 2011/0171529 A1 | 7/2011 | Kono et al. |

FOREIGN PATENT DOCUMENTS

| | | |
|---|---|---|
| JP | 2004-047404 A | 2/2004 |
| JP | 2005-259697 A | 9/2005 |
| JP | 2006-139940 A | 6/2006 |
| JP | 2007-242590 A | 9/2007 |
| JP | 2007-273108 A | 10/2007 |
| JP | 2010-073686 A | 4/2010 |
| JP | 2010-212228 A | 9/2010 |
| WO | WO 2010/116839 A1 | 10/2010 |

OTHER PUBLICATIONS

The Office Action, dated Apr. 1, 2014, issued in the corresponding Chinese Patent Application No. 201180003709.1.

* cited by examiner

NONAQUEOUS SECONDARY BATTERY

TECHNICAL FIELD

The present invention relates to a nonaqueous secondary battery with a high capacity, an excellent level of safety and excellent charge-discharge cycle characteristics.

BACKGROUND ART

High expectations have been placed on the development of nonaqueous secondary batteries including a lithium-ion secondary battery because they can produce a high voltage and have a high capacity. In addition to Li (lithium) and Li alloys, natural or artificial graphite (graphite carbon materials) into/from which Li ions can be intercalated/deintercalated have been used for negative electrode materials (negative electrode active materials) for nonaqueous secondary batteries.

Recently, however, a further increase in the capacity is demanded of batteries for compact and multifunctional portable devices. For this reason, materials capable of holding Li as much as possible, such as low crystalline carbon, Si (silicon) and Sn (tin), are receiving attention as negative electrode active materials (hereinafter also referred to as "high capacity negative electrode materials").

As one of such high capacity negative electrode materials for nonaqueous secondary batteries, $SiO_x$, which has a structure in which Si ultrafine particles are dispersed in $SiO_2$, is receiving attention (e.g., Patent documents 1 to 3). When this material is used as a negative electrode active material, charging/discharging can be performed smoothly because Si reactive with Li is in the form of ultrafine particles. At the same time, since $SiO_x$ particles themselves having the aforementioned structure have a small surface area, the material can provide favorable coating properties when they are used to form a coating for forming a negative electrode mixture layer as well as favorable bonding between the negative electrode mixture layer and the current collector.

PRIOR ART DOCUMENTS

Patent Documents

Patent document 1: JP 2004-47404 A
Patent document 2: JP 2005-259697 A
Patent document 3: JP 2007-242590 A

SUMMARY OF INVENTION

Problem to be Solved by the Invention

By the way, the high capacity negative electrode materials containing Si as a constituent element such as the material described above can change significantly in volume with charging/discharging. For this reason, the battery characteristics of a battery using such negative electrode materials may deteriorate sharply due to repeated charging/discharging. When using the high capacity negative electrode materials to form a battery, it is necessary to change, for example, the construction of a negative electrode extensively from that of a conventional nonaqueous secondary battery including a negative electrode using, for example, a graphite carbon material as an active material in order to avoid the above problem.

At the same time, there are also demands for a capacity increase by adopting the same construction as that of conventional nonaqueous secondary batteries. To achieve this by using the high capacity negative electrode materials, it is necessary to prevent the deterioration of the battery characteristics.

With the foregoing in mind, the present invention provides a nonaqueous secondary battery with a high capacity, an excellent level of safety and excellent charge-discharge cycle characteristics.

Means for Solving Problem

The nonaqueous secondary battery of the present invention is a nonaqueous secondary battery comprising a positive electrode, a negative electrode, a nonaqueous electrolyte, and a separator. The negative electrode includes a negative electrode mixture layer containing, as negative electrode active materials, a graphite carbon material and a material containing Si as a constituent element, and the positive electrode includes a positive electrode mixture layer containing, as a positive electrode active material, a lithium-containing composite oxide represented by the following general composition formula (1) and containing sulfur in a range of 0.01 mass % to 0.5 mass %:

$$Li_{1+y}MO_2 \qquad (1)$$

where y satisfies $-0.3 \le y < 0.3$, M represents a group of five or more elements including Ni, Co, Mn, Mg and at least one of Al, Ba, Sr, Ti and Zr, and when a, b, c and d represent Ni, Co, Mn, and Mg, respectively, in mol % and e represents a total of Al, Ba, Sr, Ti and Zr in mol % of all of the elements making up M, a, b, c, d, and e satisfy $70 \le a \le 97$, $0.5 < b < 30$, $0.5 < c < 30$, $0.5 < d < 30$, $-10 < c-d < 10$, $-8 \le (c-d)/d \le 8$, and $e < 10$.

Effects of the Invention

According to the present invention, it is possible to provide a nonaqueous secondary battery with a high capacity, an excellent level of safety and excellent charge-discharge cycle characteristics.

DESCRIPTION OF THE INVENTION

Figure 1A:
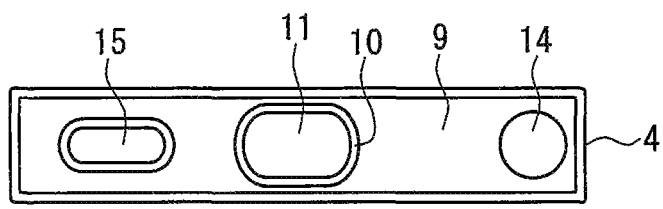
FIG. 1A is a plan view and FIG. 1B is a cross-sectional view of the nonaqueous secondary battery of the present invention.

The negative electrode used in the nonaqueous secondary battery of the present invention includes a negative electrode mixture layer containing, as negative electrode active materials, a graphite carbon material and a material containing Si as a constituent element. In addition to a simple substance of Si, examples of the material containing Si as a constituent element include materials reactive with Li electrochemically, such as Si oxides and alloys of Si and other elements including Co, Ni, Ti, Fe and Mn. In particular, a material represented by the general composition formula $SiO_x$ (where x satisfies $0.5 \le x \le 1.5$) and containing Si and O as constituent elements can be preferably used.

The present invention uses the negative electrode containing, as negative electrode active materials, the material containing Si as a constituent element and the graphite carbon material in a certain ratio. Thus, it is possible to suppress the deterioration of the battery characteristics resulting from changes in the volume of the material containing Si as a constituent element associated with charging/discharging. That is, the graphite carbon material acts not only as an active material but also a conductive assistant, so that charge/discharge reactions of the material containing Si as a constituent element can be advanced uniformly throughout the negative electrode. Moreover, since the graphite carbon material also serves as a buffer when the material containing Si as a constituent element expands and/or shrinks, the conductivity of the negative electrode as a whole can be maintained even if charging/discharging is repeated. Especially when $SiO_x$, which is poor in conductivity, is used together with the graphite carbon material, the effects resulting from the use of the graphite carbon material become significant.

However, when this negative electrode and a positive electrode containing lithium cobalt oxide ($LiCoO_2$), a material commonly used in nonaqueous secondary batteries as a positive electrode active material, are used to form a battery, evidently an increase in the capacity in line with the use of the material containing Si as a constituent element cannot be achieved.

On the other hand, when the above negative electrode is used in combination with a positive electrode containing, as a positive electrode active material, a lithium composite oxide including Ni and Mn to form a battery, it has been found that an increase in the capacity can be achieved in a favorable manner. However, studies conducted by the present inventors have revealed that the charge-discharge cycle characteristics of the battery tend to deteriorate in this case due to a different reason from the changes in the volume of the material containing Si as a constituent element associated with charging/discharging. The reason can be considered as follows. That is, Mn leaches from the lithium-containing composite oxide as the battery is charged/discharged, and precipitates selectively on the material containing Si as a constituent material, thereby causing deterioration of the negative electrode active materials, and by extension, deterioration of the negative electrode.

For this reason, the positive electrode used in the nonaqueous secondary battery of the present invention includes a positive electrode mixture layer containing, as a positive electrode active material, a lithium-containing composite oxide represented by the following general composition formula (1) and containing sulfur in a range of 0.01 mass % to 0.5 mass %:

$$Li_{1+y}MO_2 \quad (1)$$

where y satisfies $-0.3 \le y < 0.3$, M represents a group of five or more elements including Ni, Co, Mn, Mg and at least one of Al, Ba, Sr, Ti and Zr, and when a, b, c and d represent Ni, Co, Mn, and Mg, respectively, in mol % and e represents a total of Al, Ba, Sr, Ti and Zr in mol % of all of the elements making up M, a, b, c, d, and e satisfy $70 \le a \le 97$, $0.5 < b < 30$, $0.5 < c < 30$, $0.5 < d < 30$, $-10 < c-d < 10$, $-8 \le (c-d)/d \le 8$, and $e < 10$.

That is, in the present invention, the negative electrode as described above is used in combination with the positive electrode containing, as a positive electrode active material, the lithium-containing composite oxide capable of suppressing leaching of Mn associated with charging/discharging of the battery. The composite oxide can suppress the leaching because it contains a certain additional element(s) in addition to Ni, Co, Mn, and Mg. Thus, a nonaqueous secondary battery with a high capacity and excellent charge-discharge cycle characteristics can be provided.

Hereinafter, each component of the nonaqueous secondary battery of the present invention will be described.

The negative electrode used in the nonaqueous secondary battery of the present invention has a structure in which a negative electrode mixture layer containing negative electrode active materials, a binder, and the like, is formed on one side or both sides of a current collector. And for the negative electrode active materials of the negative electrode, the graphite carbon material and the material containing Si as a constituent element are used as described above. In the following descriptions, the material containing Si as a constituent element will be referred to as the Si material. The Si material may be an alloy of Si and other element in the form of a single solid solution or including a plurality of phases including a Si phase and a Si alloy phase.

Furthermore, $SiO_x$ is not limited to a Si oxide and may include an Si microcrystalline phase or Si amorphous phase. In this case, the atomic ratio between Si and O is a ratio including the Si microcrystalline phase or Si amorphous phase. In other words, materials represented by $SiO_x$ include those having a structure in which Si (e.g., microcrystalline Si) is dispersed in an amorphous $SiO_2$ matrix. In this case, the atomic ratio x, including amorphous $SiO_2$ and Si dispersed in the amorphous $SiO_2$, preferably satisfies $0.5 \le x \le 1.5$. For example, in the case of a material having a structure in which Si is dispersed in an amorphous $SiO_2$ matrix and a mole ratio of $SiO_2$ to Si is 1:1, x is equal to 1 (x=1). Hence, this material is referred to as SiO in the present invention. When a material having such a structure is analyzed by, for example, X-ray diffractometry, a peak resulting from the presence of Si (microcrystalline Si) may not be observed. However, when the material is observed under a transmission electron microscope, the presence of impalpable Si can be found. To improve effects resulting from combining $SiO_x$ with a carbon material (described later) and to prevent $SiO_x$ from becoming impalpable due to charging/discharging, $SiO_x$ having a particle size of about 0.5 to 10 μm in number average particle size can be used preferably. The number average particle size is determined by a laser diffraction/scattering particle size distribution analyzer (described later).

In the present invention, the Si material is preferably combined with a carbon material when being used as a negative electrode active material. A Si material-carbon material composite in which the surface of the Si material is coated with a carbon material can be used preferably. As described above, materials such as $SiO_x$ are poor in conductivity. Thus, to use such a material as a negative electrode active material, it is necessary to use a conductive material (conductive assistant) to form an excellent conductive network within the negative electrode in terms of ensuring favorable battery characteristics. The use of the Si material-carbon material composite allows the formation of more favorable conductive network within the negative electrode than using a mixture obtained by simply mixing the both materials.

In addition to the composite in which the surface of the Si material is coated with a carbon material as described above, examples of the Si material-carbon material composite include granules of the Si material and a carbon material.

A more favorable conductive network can be formed within the negative electrode if the composite in which the surface of the Si material is coated with a carbon material is further combined with a conductive material (e.g., a different carbon material from the carbon with which the surface of the Si material is coated). Thus, in this case, it is possible to achieve a nonaqueous secondary battery with a higher capacity and more favorable battery characteristics (e.g., charge-discharge cycle characteristic). The composite of the carbon material-coated Si material and a carbon material different from the material with which the Si material is coated may be, for example, granules obtained by further granulating a mixture of the carbon material-coated Si material and a carbon material different from the material with which the Si material is coated.

The following can also be used preferably as the Si material whose surface is coated with a carbon material; a composite obtained by further coating, with a carbon material, the surface of the composite (e.g., granules) of the Si material and a carbon material having a smaller specific resistance than the Si material. If the Si material and the carbon material are being dispersed within the granules, a more favorable conductive network can be formed. For this reason, it is possible to further improve the battery characteristics (e.g., heavy load discharge characteristics) of the nonaqueous secondary battery using the negative electrode containing the Si material as a negative electrode active material.

Preferred examples of carbon materials that can be used to form a composite with the Si material include carbon materials such as low crystalline carbon, carbon nanotube, and vapor-grown carbon fiber.

To be more specific, the carbon material is preferably at least one material selected from the group consisting of a fibrous or coil-shaped carbon material, carbon black (including acetylene black and ketjen black), artificial graphite, easily graphitizable carbon, and hardly graphitizable carbon. A fibrous or coil-shaped carbon material is preferable because it facilitates the formation of a conductive network and has a large surface area. Carbon black (including acetylene black and ketjen black), easily graphitizable carbon and hardly graphitizable carbon are preferable because they have high electrical conductivity and outstanding liquid-holding ability, and moreover they have the property of readily maintaining contact with Si material particles even if the particles expand and/or shrink.

For the carbon material, the graphite carbon material used as a negative electrode active material along with the Si material can also be used. As with carbon black, etc., the graphite carbon material also has high electrical conductivity and outstanding liquid-holding ability, and moreover it has the property of readily maintaining contact with the particles of the Si material even if the particles expand and/or shrink. Thus, it can be used preferably to form a composite with the Si material.

Among the carbon materials described above, it is particularly preferable to use a fibrous carbon material to form a composite with the Si material in the form of granules. Since a fibrous carbon material has a thin thready shape and is highly flexible, it can respond to expansion and/or shrinkage of the Si material associated with charging/discharging of the battery. Also, the fibrous carbon material has a large bulk density, so that it can have many contacts with the Si material particles. Examples of the fibrous carbon include polyacrylonitrile (PAN) carbon fiber, pitch carbon fiber, vapor-grown carbon fiber, and carbon nanotube, and any of these materials may be used.

It is also possible to form the fibrous carbon material on the surface of the Si material particles by, for example, vapor phase epitaxy.

For example, while $SiO_x$ generally has a specific resistance of $10^3$ to $10^7$ kΩcm, the carbon materials described above generally have a specific resistance of $10^{-5}$ to 10 kΩcm.

Further, the Si material-carbon material composite may further include a material layer (material layer containing hardly graphitizable carbon) covering the carbon material coating layer on the particle surface.

When using the Si material-carbon material composite in the negative electrode, the ratio of the carbon material to the Si material is preferably 5 parts by mass or more, and more preferably 10 parts by mass or more carbon material to 100 parts by mass Si material in terms of favorably exhibiting the effects resulting from combining the Si material with the carbon material. If the carbon material combined with the Si material makes up an excessively large proportion of the composite, it may lead to a decline in the amount of the Si material contained in the negative electrode mixture layer, and the effect of increasing the capacity may decline. For this reason, the ratio of the carbon material to the Si material is preferably 50 parts by mass or less, and more preferably 40 parts by mass or less carbon material to 100 parts by mass Si material.

For example, the Si material-carbon material composite can be obtained as follows.

First, a method for producing a composite of the Si materials will be described. A dispersion in which the Si materials are dispersed in a dispersion medium is prepared. Then, the dispersion is sprayed and dried to produce composite particles including a plurality of particles. For example, ethanol or the like can be used as the dispersion medium. It is suitable to spray the dispersion normally in a 50 to 300° C. atmosphere. In addition to this method, similar composite particles can be produced by mechanical granulation using a vibration or planetary ball mill or rod mill.

When producing granules of the Si material and a carbon material having a smaller specific resistance than the Si material, the carbon material is added to a dispersion in which the Si material is dispersed in a dispersion medium, and this dispersion is used to produce composite particles (granules) by the same technique used to combine the Si materials. Also, the Si material-carbon material granules can be produced by the mechanical granulation described above.

Next, when producing a composite by coating the surface of the Si material particles (or Si material-carbon material granules) with a carbon material, the Si material particles and hydrocarbon gas are heated in a vapor phase to deposit carbon generated by the thermal decomposition of the hydrocarbon gas on the surface of the particles. In this way, the hydrocarbon gas can be distributed throughout the composite particles by chemical-vapor deposition (CVD), so that a thin and uniform coating containing the conductive carbon material (i.e., carbon material coating layer) can be formed on the surface of the particles and holes in the surface. Thus, conductivity can be imparted to the Si material particles uniformly by using a small amount of carbon material.

The treatment temperature (atmospheric temperature) of the chemical-vapor deposition (CVD) varies depending on the type of hydrocarbon gas used, but normally 600 to 1200° C. is considered suitable. In particular, the treatment temperature is preferably 700° C. or more, and more preferably 800° C. or more. This is because higher treatment temperature leads to lesser residual impurities and allows the formation of the coating layer containing highly conductive carbon.

Although toluene, benzene, xylene, mesitylene or the like can be used as the liquid source of the hydrocarbon gas, toluene is particularly preferable because it is ease to handle. The hydrocarbon gas can be obtained by evaporating (e.g., bubbling with nitrogen gas) any of these liquid sources. It is also possible to use methane gas, acetylene gas, and the like.

After coating the surface of the Si material particles (or the Si material-carbon material granules) with the carbon material by chemical-vapor deposition (CVD), at least one organic compound selected from the group consisting of petroleum pitch, coal pitch, thermosetting resin, and condensation product of naphthalene sulfonate and aldehydes is adhered to the coating layer containing the carbon material, and then the particles to which the organic compound is adhered may be fired.

Specifically, a dispersion in which the organic compound and the Si material particles (or the Si material-carbon material granules) whose surface is coated with the carbon material are dispersed in a dispersion medium is prepared, and the dispersion is sprayed and dried to form particles coated with the organic compound. Then, the particles coated with the organic compound are fired.

Isotropic pitch can be used as the pitch, and a phenol resin, furan resin, furfural resin or the like can be used as the thermosetting resin. A naphthalene sulfonate-formaldehyde condensation product can be used as the condensation product of naphthalene sulfonate and aldehydes.

For the dispersion medium in which the organic compound and the Si material particles whose surface is coated with the carbon material are dispersed, water or alcohols (e.g., ethanol) can be used, for example. It is suited to spray the dispersion normally in a 50 to 300° C. atmosphere. Normally 600 to 1200° C. is considered suitable for the firing temperature. In particular, the firing temperature is preferably 700° C. or more, and more preferably 800° C. or more. This is because higher treatment temperature leads to lesser residual impurities and allows the formation of the coating layer containing highly conductive carbon. However, the treatment temperature needs to be smaller than or equal to the melting point of the Si material.

Examples of the graphite carbon material used as a negative electrode active material along with the Si material-carbon material composite include: natural graphite such as scaly graphite; and artificial graphite obtained by graphitizing easily graphitizable carbons, such as pyrocarbons, mesocarbon microbeads (MCMB) and carbon fiber, at 2800° C. or more.

In terms of favorably ensuring the effects of increasing the capacity resulting from the use of the Si material, the amount of the Si material-carbon material composite contained in the negative electrode according to the present invention is preferably 0.01 mass % or more, more preferably 1 mass % or more, and still more preferably 3 mass % or more. Further, in terms of more favorably voiding the problems resulting from the changes in the volume of the Si material associated with charging/discharging, the amount of the Si material-carbon material composite contained in the negative electrode is preferably 20 mass % or less, and more preferably 15 mass % or less.

The negative electrode according to the present invention can be obtained as follows. A negative electrode mixture-containing composition in the form of a paste or slurry is obtained by adding a suitable solvent (dispersion medium) to a mixture (negative electrode mixture) containing the Si material (e.g., $SiO_x$)-carbon material composite, the graphite carbon material, a binder, and the like, and sufficiently mixing the mixture. Then, the composition is applied to one side or both sides of a current collector, and the solvent (dispersion medium) is removed by drying or the like to form a negative electrode mixture layer having a certain thickness and density, thus obtaining the negative electrode. The method for producing the negative electrode according to the present invention is not limited to the one mentioned, and the negative electrode can be produced by other methods.

Examples of the binder used in the negative electrode mixture layer include: polysaccharides such as starch, polyvinyl alcohol, polyacrylic acid, carboxymethyl cellulose (CMC), hydroxypropyl cellulose, regenerated cellulose and diacetyl cellulose and modified products thereof; thermoplastic resins such as polyvinyl chloride, polyvinyl pyrrolidone, polytetrafluoroethylene, polyvinylidene fluoride, polyethylene, polypropylene, polyamideimide, and polyamide and modified products thereof, polyimide; elastically resilient polymers such as ethylene-propylene-dieneter polymer (EPDM), sulfonated EPDM, styrene butadiene rubber (SBR), butadiene rubber, polybutadiene, fluorocarbon rubber and polyethylene oxide and modified products thereof. These materials may be used individually or in combination of two or more.

A conductive material may further be added to the negative electrode mixture layer as a conductive assistant. Such a conductive material is not particularly limited as long as it does not chemically react in the nonaqueous secondary battery. Materials such as carbon black (e.g., thermal black, furnace black, channel black, ketjen black, and acetylene black), carbon fiber, metal powders (e.g., powders of copper, nickel, aluminum, and silver), metal fiber, polyphenylene derivative (the one described in JP S59-20971 A) can be used individually or in combination of two or more. Among these materials, it is preferable to use carbon black, and more preferably ketjen black or acetylene black.

The particle size of the carbon material to be used as a conductive assistant is preferably 0.01 μm or more, and more preferably 0.02 μm or more, and is preferably 10 μm or less, and more preferably 5 μm or less in number average particle size determined by a laser diffraction/scattering particle size distribution analyzer (described later).

In the negative electrode mixture, it is preferable that the total amount of the negative electrode active materials (total of the $SiO_x$-carbon material composite and the graphite carbon material) is 80 to 99 mass % and the amount of the binder is 1 to 20 mass %. Further, when using a conductive material additionally as a conductive assistant, it is preferable to use the conductive material in such a range that the total amount of the negative electrode active materials and the amount of the binder satisfy the preferred values mentioned above.

The thickness of the negative electrode mixture layer is preferably 10 to 100 μm per one side of the current collector. The density of the negative electrode mixture layer (which is calculated from the thickness and mass per unit area of the negative electrode mixture layer laminated on the current collector) is preferably in a range of 1.0 $g/cm^3$ to 1.9 $g/cm^3$.

For the negative electrode current collector, a metal foil, punched metal, metal mesh, expanded metal or the like made of copper or nickel can be used, but generally a copper foil is used. When reducing the thickness of the negative electrode as a whole to achieve a battery with a high energy density, an upper limit to the thickness of the negative electrode current collector is preferably 30 μm and a lower limit to the thickness of the negative electrode current collector is desirably 5 μm in order to ensure the mechanical strength.

The positive electrode used in the nonaqueous secondary battery of the present invention has a structure in which a positive electrode mixture layer containing positive electrode active materials, a binder, a conductive assistant, and the like is formed on one side or both sides of a current collector.

The lithium-containing composite oxide represented by the general composition formula (1) and having a certain sulfur content is used for the positive electrode active material. By using the positive electrode containing such a positive electrode active material in combination with the negative electrode described above to form a lithium-ion secondary battery, the capacity of the battery can be increased. The reason for this is as follows.

When a negative electrode containing $SiO_x$ as a negative electrode active material is used in combination with a positive electrode containing a positive electrode active material used generally in lithium-ion secondary batteries and having a relatively small irreversible capacity at the time of charging/discharging, such as $LiCoO_2$, to form a battery, the effect of increasing the capacity resulting from the use of $SiO_x$ is less likely to be produced because $SiO_x$ has a large irreversible capacity. However, the lithium-containing composite oxide represented by the general composition formula (1) and having a certain sulfur content has a relatively large irreversible capacity in spite of having a larger capacity than $LiCoO_2$. Thus, when a positive electrode containing this material as a positive electrode active material is used in combination with a negative electrode using $SiO_x$ as a negative electrode active material, the balance between the positive electrode and the negative electrode in terms of irreversible capacity becomes favorable, so that the effect of increasing the capacity resulting from the use of $SiO_x$ can be produced favorably.

By the way, a battery including a combination of a positive electrode using a lithium-containing composite oxide containing Mn as a positive electrode active material and the negative electrode using the graphite carbon material and the $SiO_x$-carbon material composite as negative electrode active materials has poorer charge-discharge cycle characteristics than a battery including a combination of the same positive electrode and a negative electrode using a carbon material such as a graphite carbon material as the only negative electrode active material.

It is known that Mn is likely to leach from a positive electrode using a lithium-containing composite oxide containing Mn as a positive electrode active material. In a battery including a combination of this positive electrode and the negative electrode using the graphite carbon material and the $SiO_x$-carbon material composite as negative electrode active materials, it is found that Mn precipitates selectively on the surface of the $SiO_x$-carbon material composite. In the negative electrode using the graphite carbon material and the $SiO_x$-carbon material composite as negative electrode active materials, $SiO_x$ of the composite makes a larger contribution to the capacity than the graphite carbon material. For this reason, it is believed that deterioration of $SiO_x$ caused by the selective precipitation of Mn leads to deterioration of the negative electrode as a whole, thereby impairing the charge-discharge cycle characteristics of the battery.

In contrast, the positive electrode using, as a positive electrode active material, the lithium-containing composite oxide represented by the general composition formula (1) and having a certain sulfur content allows an increase in the capacity and improvements in the charge/discharge cycle characteristics at the same time even if it is used in combination with the negative electrode using, as negative electrode active materials, the graphite carbon material and the $SiO_x$-carbon material composite. It is considered that the reason for this is because the positive electrode using the lithium-containing composite oxide represented by the general composition formula (1) and having a certain sulfur content can reduce the amount of Mn that leaches due to repeated charging/discharging.

Of the lithium-containing composite oxide represented by the general composition formula (1), Ni is a component that contributes to an increase in the capacity of the lithium-containing composite oxide.

In terms of improving the capacity of the lithium-containing composite oxide, a as the percentage of Ni is preferably 70 mol % or more, and more preferably 80 mol % or more, where the percentage of all of the elements making up the element group M in the general composition formula (1) representing the lithium-containing composite oxide is 100 mol %. However, when Ni makes up an excessive proportion of the element group M, for example, the amount of Co, Mn and Mg declines, so that the effects resulting from these elements may drop. For this reason, a as the percentage of Ni is set to be 97 mol % or less, where the percentage of all of the elements making up the element group M in the general composition formula (1) representing the lithium-containing composite oxide is 100 mol %.

In the present invention, the percentage of Ni of the element group M is adjusted in the range as described above. Thus, the capacity of the lithium-containing composite oxide can be increased to 185 mAh/g or more when a driving voltage is 2.5 to 4.3 V on a lithium metal basis.

The electrical conductivity of the lithium-containing composite oxide declines as Ni has a smaller average valence. For this reason, Ni has an average valence of preferably 2.5 to 3.2 in the lithium-containing composite oxide. The average valence is determined by a method explained later in Examples. If Ni has such a valence, the lithium-containing composite oxide having a higher capacity can be achieved when a driving voltage is 2.5 to 4.3 V on a lithium metal basis.

If Co is present in the crystal lattice of the lithium-containing composite oxide represented by the general composition formula (1), it is possible to relieve irreversible reactions resulting from phase transitions of the lithium-containing composite oxide caused by intercalation/deintercalation of Li at the time of charging/discharging of the nonaqueous secondary battery and to improve the reversibility of the crystal structure of the lithium-containing composite oxide. As a result, a nonaqueous secondary battery having a long charge/discharge cycle life can be formed.

In terms of more favorably ensuring the effect of improving the reversibility of the crystal structure of the lithium-containing composite oxide resulting from Co, b as the percentage of Co is preferably 0.5 mol % or more, and more preferably 1 mol % or more, where the percentage of all of the elements making up the element group M in the general composition formula (1) representing the lithium-containing composite oxide is 100 mol %. However, if Co makes up an excessive proportion of the element group M, the amount of Ni, Mn and Mg declines, so that the effects resulting from these elements may drop. For this reason, b as the percentage of Co is less than 30 mol %, where the percentage of all of the elements making up the element group M in the general composition formula (1) representing the lithium-containing composite oxide is 100 mol %.

In terms of more favorably ensuring the effects resulting from Co, Co has an average valence of preferably 2.5 to 3.2 in the lithium-containing composite oxide. The average valence is determined by the method explained later in Examples.

The lithium-containing composite oxide contains Mn and Mg in its crystal lattice in such a manner that c as the percentage of Mn (mol %) and d as the percentage of Mg (mol %) satisfy $0.5 < c < 30$, $0.5 < d < 30$, $-10 < c-d < 10$, and $-8 < (c-d)/d \leq 8$, where the percentage of all of the elements making up the element group M in the general composition formula (1) representing the lithium-containing composite oxide is 100 mol %. Consequently, $Mg^{2+}$ dislocates itself to Li sites when a phase transition of the lithium-containing composite oxide occurs due to deintercalation/intercalation of Li, thereby relieving irreversible reactions. Thus, the reversibility of the layered crystal structure of the lithium-containing composite oxide represented by the space group R3-m improves. Furthermore, since tetravalent Mn stabilizes bivalent Mg, a nonaqueous secondary battery having a long charge/discharge cycle life can be formed.

In terms of more favorably ensuring the effect of stabilizing bivalent Mg resulting from Mn, c as the percentage of Mn is preferably 1 mol % or more, and more preferably 2 mol % or more, and is preferably 10 mol % or less, and more preferably 7 mol % or less, where the percentage of all of the elements making up the element group M in the general composition formula (1) representing the lithium-containing composite oxide is 100 mol %.

Further, in terms of more favorably ensuring the effect of improving the reversibility of the layered crystal structure of the lithium-containing composite oxide resulting from Mg, d as the percentage of Mg is preferably 1 mol % or more, and more preferably 2 mol % or more, and in terms of the charge/discharge capacity, d as the percentage of Mg is preferably 15 mol % or less, more preferably 10 mol % or less, and still more preferably 7 mol % or less, where the percentage of all of the elements making up the element group M in the general composition formula (1) representing the lithium-containing composite oxide is 100 mol %.

And in the lithium-containing composite oxide, it is desirable that the difference between Mn and Mg in composition ratio is small. Thus, c and d satisfy preferably $-3 \le c-d \le 3$, and preferably $-2 \le (c-d)/d \le 2$.

In terms of further improving the reversibility of the crystal structure of the lithium-containing composite oxide, Mg has an average valence of preferably 1.8 to 2.2 in the lithium-containing composite oxide. The average valence is determined by the method explained later in Examples.

Further, in terms of stabilizing Mg to let it provide its effect more effectively, Mn has an average valence of preferably 3.5 to 4.2 in the lithium-containing composite oxide. The average valence is determined by the method explained later in Examples.

The lithium-containing composite oxide contains at least one element of Al, Ba, Sr, Ti and Zr as a member of the element group M along with Ni, Co, Mn, and Mg.

If Al is present in the crystal lattice of the lithium-containing composite oxide, the crystal structure of the lithium-containing composite oxide can be stabilized, and the thermal stability of the lithium-containing composite oxide can be improved. As a result, a nonaqueous secondary battery with a higher level of safety can be formed. Furthermore, the presence of Al in the grain boundaries of and on the surface of the lithium-containing composite oxide particles improves the temporal stability of the lithium-containing composite oxide. Thus, it is possible to prevent the lithium-containing composite oxide from having a side reaction with a nonaqueous electrolyte and to form a nonaqueous secondary battery having a longer life.

To favorably ensure the effect resulting from containing Al in the lithium-containing composite oxide, the percentage of Al is preferably 0.01 mol % or more, and in terms of the charge/discharge capacity, the percentage of Al is preferably 10 mol % or less, where the percentage of all of the elements making up the element group M in the general composition formula (1) representing the lithium-containing composite oxide is 100 mol %.

The inclusion of alkali-earth metal elements such as Ba and Sr in the lithium-containing composite oxide particles promotes the growth of primary particles, and this leads to improvements in the crystal properties of the lithium-containing composite oxide. As a result, it is possible to prevent the lithium-containing composite oxide from having a side reaction with the nonaqueous electrolyte and to form a battery that is less likely to swell even if it is stored at a high temperature. In particular, Ba is a suitable alkali-earth metal element. The percentage of at least one of Ba and Sr (the percentage of the both elements when they are both contained) is preferably 10 mol % or less, more preferably 5 mol % or less, and still more preferably 3 mol % or less, where the percentage of all of the elements making up the element group M in the general composition formula (1) representing the lithium-containing composite oxide is 100 mol %. Further, to favorably ensure the effects resulting from the inclusion of Ba and/or Sr, the percentage of at least one of Ba and Sr (the percentage of the both elements when they are both contained) is preferably 0.01 mol % or more, where the percentage of all of the elements making up the element group M in the general composition formula (1) representing the lithium-containing composite oxide is 100 mol %.

The inclusion of Ti in the lithium-containing composite oxide particles stabilizes the crystal structure as Ti is disposed in defective portions of the crystal such as oxygen deficiency in the $LiNiO_2$ crystal structure. Consequently, the reversibility of reaction of the lithium-containing composite oxide improves, so that a nonaqueous secondary battery having more excellent charge-discharge cycle characteristics can be formed.

To favorably ensure the effect resulting from Ti, the percentage of Ti is preferably 0.01 mol % or more, and more preferably 0.1 mol % or more, where the percentage of all of the elements making up the element group M in the general composition formula (1) representing the lithium-containing composite oxide is 100 mol %. Further, the percentage of Ti is preferably 10 mol % or less, more preferably 5 mol % or less, and still more preferably 2 mol % or less, where the percentage of all of the elements making up the element group M in the general composition formula (1) representing the lithium-containing composite oxide is 100 mol %.

If the lithium-containing composite oxide contains Zr, the presence of Zr in the grain boundaries of and on the surface of the lithium-containing composite oxide particles suppresses the surface reactivity of the particles without impairing the electrochemical characteristics of the lithium-containing composite oxide. For this reason, it is believed that the leaching of Mn associated with the charge/discharge cycle of the battery can be suppressed more favorably. Moreover, as a result of the effect resulting from Zr, i.e., the effect of suppressing the reactivity of the particle surface, a nonaqueous secondary battery having excellent storage characteristics and a long life can be formed.

To ensure the effect resulting from the inclusion of Zr more favorably, the percentage of Zr is preferably 0.01 mol % or more, and more preferably 0.1 mol % or more, and in terms of the charge/discharge capacity, the percentage of Zr is preferably 3 mol % or less, where the percentage of all of the elements making up the element group M in the general composition formula (1) representing the lithium-containing composite oxide is 100 mol %.

The lithium-containing composite oxide preferably contains at least one element selected from Al, Ba, Sr, Ti and Zr as a member of the element group M along with Ni, Co, Mn and Mg. Specifically, the lithium-containing composite oxide may contain only one element or two or more elements of Al, Ba, Sr, Ti and Zr. However, the percentage of Al, Ba, Sr, Ti and Zr in total needs to be 10 mol % or less, where the percentage of all of the elements forming the element group M in the general composition formula (1) representing the lithium-containing composite oxide is 100 mol %.

The element group M in the general composition formula (1) representing the lithium-containing composite oxide may contain an element other than Ni, Co, Mn, Mg, Al, Ba, Sr, Ti and Zr, such as Cr, Fe, Cu, Zn, Ge, Sn, Ca, Ag, Ta, Nb, Mo, B, P, W, and Ga. However, to achieve the effects of the present invention adequately, the percentage of an element other than Ni, Co, Mn, Mg, Al, Ba, Sr, Ti, and Zr is preferably 10 mol % or less, and more preferably 3 mol % or less, where the percentage of all of the elements making up the element group M in the general composition formula (1) representing the lithium-containing composite oxide is 100 mol %. An element of the element group M other than Ni, Co, Mn, Mg, Al, Ba, Sr, Ti, and Zr may be distributed uniformly throughout the lithium-containing composite oxide or may be segregated on the particle surface.

The lithium-containing composite oxide of the above composition has a high true density, e.g., a true density of 4.55 to 4.95 g/cm$^3$, resulting in a material having a high volumetric energy density. The true density of the lithium-containing composite oxide containing Al and Mn in a certain range can vary significantly depending on the composition. In the above narrow composition range, however, the lithium-containing composite oxide is considered to be synthesized stably and have a high true density as described above. Moreover, since the capacity per mass of the lithium-containing composite oxide can be increased, it is possible to achieve a material with excellent reversibility.

The true density of the lithium-containing composite oxide increases especially when the composition of the lithium-containing composition oxide is close to stoichiometric proportions. Specifically, in the general composition formula (1), y preferably satisfies $-0.3 \leq y < 0.3$. By adjusting y to have such a value, the true density can be increased and the reversibility can be improved. It is preferable that y is −0.1 or more and 0.1 or less. In this case, the lithium-containing composite oxide can have a high true density, e.g., a true density of 4.6 g/cm$^3$ or more.

Furthermore, the lithium-containing composite oxide contains a sulfur component. It is believed that the presence of the sulfur component in the grain boundaries of and on the surface of the lithium-containing composite oxide suppresses the surface reactivity of the composite oxide without impairing the electrochemical characteristics of the lithium-containing composite oxide, so that the leaching of Mn associated with the charge/discharge cycle of the battery can be suppressed. Thus, the use of such a lithium-containing composite oxide prevents selective deterioration of $SiO_x$ which may be caused by the leaching of Mn, thereby allowing improvements in the charge/discharge cycle characteristics of the battery.

In terms of favorably ensuring the above-described effects, the lithium-containing composite oxide has a sulfur content of preferably 0.01 mass % or more, and more preferably 0.04 mass % or more. However, when the sulfur content of the lithium-containing composite oxide is too large, the diffusion of Li ions may be blocked, which may lead to deterioration of the output characteristics. For this reason, the lithium-containing composite oxide has a sulfur content of preferably 0.5 mass % or less, more preferably 0.3 mass % or less, and most preferably 0.15 mass % or less.

Because the reactivity of the surface of the lithium-containing composite oxide particles is reduced adequately, generation of gas in the nonaqueous secondary battery of the present invention is suppressed. Especially when the battery is formed to have a rectangular (rectangular cylindrical) outer package, deformation of the outer package can be prevented, so that the life and storage characteristics of the battery can be improved. In terms of ensuring these effects, the lithium-containing composite oxide preferably has the following form. First, the lithium-containing composite oxide is preferably in the form of particles, and its primary particles having a particle size of 0.7 μm or less make up preferably 30 vol % or less, and more preferably 15 vol % or less of all of the primary particles. Further, the lithium-containing composite oxide has a BET specific surface area of preferably 0.3 m$^2$/g or less, and more preferably 0.25 m$^2$/g or less.

That is, if the primary particles having a particle size of 0.7 μm or less make up an excessive proportion of all of the primary particles and the BET specific surface area of the lithium-containing composite oxide is too large, the reaction area and active sites increase, so that irreversible reactions between the lithium-containing composite oxide and moisture in air, a binder used to form the electrode mixture layer, and the nonaqueous electrolyte of the battery are likely to occur. This may lead to the generation of gas in the battery, and cause deformation of the outer package and gelling of a solvent-containing composition (paste, slurry, etc.) used to form the positive electrode mixture layer.

The lithium-containing composite oxide may contain no primary particle having a particle size of 0.7 μm or less. That is, the percentage of the primary particles having a particle size of 0.7 μm or less may be 0 vol %. Further, to prevent the reactivity of the lithium-containing composite oxide from declining more than necessary, the lithium-containing composite oxide has a BET specific surface area of preferably 0.1 m$^2$/g or more. Furthermore, the lithium-containing composite oxide has a number average particle size of preferably 5 to 25 μm.

The percentage of the primary particles having a particle size of 0.7 μm or less included in the lithium-containing composite oxide and the number average particle size of the lithium-containing composite oxide (furthermore, the number average particle size of other active materials (described later)) can be measured by a laser diffraction/scattering particle size distribution analyzer, for example, by "MICROTRAC HRA" manufactured by NIKKISO CO., LTD. Further, the BET specific surface area of the lithium-containing composite oxide is a specific surface area of the surface of the active material and micropores obtained by measuring and calculating the surface area using a BET equation, which is a theoretical equation for multilayer adsorption. Specifically, the BET specific surface area is measured by a specific surface area analyzer "Macsorb HM model-1201" manufactured by Mountech Co., Ltd. based on a nitrogen adsorption method.

In terms of increasing the density of the positive electrode mixture layer to further increase the capacity of the positive electrode, and by extension, the capacity of the nonaqueous secondary battery, the particles of the lithium-containing composite oxide are preferably spherical or substantially spherical in shape. This allows reasonable movements of the particles during a pressing process (described later in detail) carried out in the production of the positive electrode to increase the density of the positive electrode mixture layer by moving the particles of the lithium-containing composite oxide by pressing, so that the particles can be rearranged smoothly. As a result, it is possible to reduce the press load, which in turn reduces damage to the current collector associated with the pressing. Accordingly, the productivity of the positive electrode, and moreover, the productivity of the nonaqueous secondary battery can be improved. Moreover, if the particles of the lithium-containing composite oxide are spherical or substantially spherical in shape, the particles can withstand a larger pressing pressure, which allows a further increase in the density of the positive electrode mixture layer.

In terms of improving the filling properties of the positive electrode mixture layer, the lithium-containing composite oxide has a tap density of preferably 2.3 g/cm$^3$ or more, and more preferably 2.8 g/cm$^3$ or more. Further, it is preferable that the lithium-containing composite oxide has a tap density of 3.8 g/cm$^3$ or less. That is, if the particles have a high tap density and no hole in their interior, or the particles have a small percentage of holes (e.g., the percentage of area of minute holes of 1 μm or less measured by cross section observation of the particles is 10% or less), the filling properties of the lithium-containing composite oxide in the positive electrode mixture layer can be improved.

The tap density of the lithium-containing composite oxide can be determined using a tap density measuring device "POWDER TESTER MODEL PT-S" manufactured by Hosokawa Micron Corporation in the following manner. First, the measuring particles are put in a 100 cm$^3$ measuring cup and leveled off. Then, tapping is performed 180 times while adding the particles by the amount corresponding to a decrease in volume as needed. After the tapping is finished, excess particles are leveled off with a blade. Subsequently, the mass (A) (g) is measured, and the tap density is determined by the following formula.

Tap density (g/cm$^3$)=(A)/100

It is very difficult to synthesize the lithium-containing composite oxide of high purity simply by mixing material compounds such as a Li-containing compound, an Ni-containing compound, a Co-containing compound, an Mn-containing compound, and an Mg-containing compound and firing the resultant mixture. The reason for this is considered as follows. Since Ni and Mn, for example, have a low diffusion velocity in a solid, it is difficult to diffuse these elements uniformly during the synthesis reaction of the lithium-containing composite oxide. As a result, Ni, Mn and the like are less likely to be distributed uniformly in the lithium-containing composite oxide produced.

Thus, when synthesizing the lithium-containing composite oxide of the present invention, it is preferable to adopt a method including firing a Li-containing compound, a composite compound containing Ni, Co, Mn, and Mg as constituent elements, and a compound containing at least one element of Al, Ba, Sr, Ti, and Zr. By such a method, the lithium-containing composite oxide of high purity can be synthesized with relative ease. That is, the composite compound containing at least Ni, Co, Mn, and Mg is synthesized beforehand. When this composite compound is fired along with the compound containing at least one element of Al, Ba, Sr, Ti, and Zr and the Li-containing compound, Ni, Co, Mn, and Mg are distributed uniformly during the oxide forming reaction, thus synthesizing a lithium-containing composite oxide of higher purity. The same also applies to the compound containing at least one element of Al, Ba, Sr, Ti, and Zr. When synthesizing the composite oxide beforehand to produce a more uniform lithium-containing composite oxide, a composite oxide containing Ni, Co, Mn, Mg, and at least one element of Al, Ba, Sr, Ti, and Zr may be produced, and the composite oxide may be fired along with the Li-containing compound.

The method for synthesizing the lithium-containing composite oxide of the present invention is not limited to the method described above. However, it is believed that the physical properties of the final composite oxide, such as the structural stability, charge-discharge reversibility, and true density, vary significantly depending on what synthesizing process is used.

The composite compound containing Ni, Co, Mn, and Mg may be, for example, a coprecipitation compound, hydrothermally synthesized compound, or mechanically synthesized compound containing Ni, Co, Mn, and Mg, or a compound obtained by heat-treating any of them. Preferred examples of the composite compound include a hydroxide containing Ni, Co, Mn, and Mg, an oxyhydroxide containing Ni, Co, Mn, and Mg, and an oxide obtained by heat-treating any of them, such as $Ni_{0.90}Co_{0.06}Mn_{0.02}Mg_{0.02}(OH)_2$ and $Ni_{0.90}Co_{0.06}Mn_{0.02}Mg_{0.02}OOH$.

When the element group M of the lithium-containing composite oxide includes an element other than Ni, Co, Mn, and Mg and at least one element of Al, Ba, Sr, Ti, and Zr (e.g., at least one element selected from the group consisting of Cr, Fe, Cu, Zn, Ge, Sn, Ca, Ag, Ta, Nb, Mo, B, P, W, and Ga) (hereinafter, these elements are grouped together and referred to as the "element M'") as a member, such a lithium-containing composite oxide can be synthesized by mixing the composite compound containing Ni, Co, Mn, and Mg, the compound containing at least one element of Al, Ba, Sr, Ti, and Zr, the Li-containing compound, and a compound containing the element M', and firing the resultant mixture.

The quantitative proportions of Ni, Co, Mn, Mg, the element M' and at least one element of Al, Ba, Sr, Ti and Zr in the composite compound may be adjusted as needed in accordance with the intended lithium-containing composite oxide composition.

For example, if sulfate is used for the compound containing at least one element of Al, Ba, Sr, Ti, and Zr in firing the composite compound containing Ni, Co, Mn, and Mg as constituent elements, the compound containing at least one element of Al, Ba, Sr, Ti, and Zr, the Li-containing compound, and if needed a compound containing the element M', a lithium-containing composite oxide containing a sulfur component in the grain boundaries and on the surface can be obtained with ease.

Examples of the Li-containing compound usable for the synthesis of the lithium-containing composite oxide include a variety of lithium salts including lithium hydroxide, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate, and lithium oxide. Among these materials, lithium hydroxide is preferred because it does not generate gas that adversely affects the environment such as carbon dioxide, nitrogen oxide, and sulfur oxide.

To synthesize the lithium-containing composite oxide, first, the various material compounds are mixed such that the proportions of the elements contained in the material compounds substantially correspond to the intended lithium-containing composite oxide composition. Then, the material mixture thus obtained is fired, for example, at 600 to 900° C. for 1 to 24 hours, resulting in the lithium-containing composite oxide.

When firing the material mixture, the reaction preferably proceeds by raising the temperature gradually rather than immediately to a certain temperature. That is, the temperature is first raised to a temperature (e.g., 250 to 850° C.) lower than the firing temperature, this temperature is maintained for preheating, and then the temperature is raised to the firing temperature. Moreover, it is preferable that the oxygen concentration in the firing environment is maintained at a constant level.

In the process of production, the lithium-containing composite oxide of the present invention tends to have a nonstoichiometric composition because the trivalent Ni is unstable. For this reason, the reactions of the various material composites of the material mixture are allowed to proceed step by step, thereby improving the homogeneity of the lithium-containing composite oxide to be produced and achieving stable crystal growth of the lithium-containing composite oxide produced. That is, if the temperature is immediately raised to the firing temperature, or if the oxygen concentration in the firing environment is reduced during firing, the reactions of the various material compounds of the material mixture become nonuniform, and that the uniformity of the composition is likely to be impaired.

The preheating time is not particularly limited, and generally can be about 0.5 to 30 hours.

The firing atmosphere of the material mixture can be, for example, an atmosphere containing oxygen (i.e., in air), a mixed atmosphere of inert gas (such as argon, helium, or nitrogen) and oxygen gas, and an oxygen gas atmosphere. At that time, the oxygen concentration (volume basis) is preferably 15% or more, and more preferably 18% or more. However, in terms of reducing the production cost of the lithium-containing composite oxide to improve the productivity of the lithium-containing composite oxide, and by extension, the productivity of the battery, it is more preferable that the material mixture is fired in an atmospheric flow.

The flow rate of the gas in the firing of the material mixture is preferably 2 $dm^3$/min or more per 100 g of the material mixture. If the flow rate of the gas is too small, i.e., if the gas flows too slowly, the homogeneity of the composition of the lithium-containing composite oxide may be impaired. It should be noted that the flow rate of the gas in the firing of the material mixture is preferably 5 $dm^3$/min or less per 100 g of the material mixture.

In the firing process of the material mixture, a dry-blended mixture may be used as it is. However, it is preferable that the material mixture is dispersed in a solvent such as ethanol to form a slurry, and the slurry is mixed in a planetary ball mill or the like for about 30 to 60 minutes and dried. This method can further improve the homogeneity of the lithium-containing composite oxide to be synthesized.

By controlling the gas composition, the firing temperature, and the like in the above production method in accordance with the composition, it is possible to obtain a lithium-containing composite oxide that satisfies the particle size, the BET specific surface area, the number average particle size, and the tap density as described above.

A lithium-containing composite oxide other than the lithium-containing composite oxide represented by the general composition formula (1) and having the mentioned sulfur content may be used additionally as a positive electrode active material. Examples of such lithium-containing composite oxides include: lithium cobalt oxides such as $LiCoO_2$; lithium manganese oxides such as $LiMnO_2$, $LiMn_2O_4$, and $Li_2MnO_3$; lithium nickel oxides such as $LiNiO_2$, and lithium-containing composite oxides obtained by using a variety of elements as substituents for the basic composition of the oxides mentioned, such as $LiCo_{1-x}Ni_xO_2$ and $LiNi_{1-x-y}Co_xAl_yO_2$. Furthermore, lithium-containing composite oxides having a spinel structure such as $LiMn_2O_4$ and $Li_{4/3}Ti_{5/3}O_4$ and lithium-containing composite oxides having an olivine structure such as $LiFePO_4$ can be used preferably.

Although the lithium-containing composite oxide represented by the general composition formula (1) and having the mentioned sulfur content is used as a positive electrode active material, it is more preferable to use the lithium-containing composite oxide represented by the general composition formula (1) and having the mentioned sulfur content alone or a combination of $LiCoO_2$ and the lithium-containing composite oxide represented by the general composition formula (1) and having the mentioned sulfur content. If $LiCoO_2$ and the lithium-containing composite oxide represented by the general composition formula (1) and having the mentioned sulfur content are used in combination in the form of a mixture, it is possible to form a battery having both high electromotive force and relatively large capacity because $LiCoO_2$ has a high true density and is charged/discharged at a relatively large potential.

When using the lithium-containing composite oxide represented by the general composition formula (1) and having the mentioned sulfur content in combination with other lithium-containing composite oxide, the lithium-containing composite oxide represented by the general composition formula (1) and having the mentioned sulfur content makes up preferably 5 mass % or more, and more preferably 10 mass % or more of all of the active materials in terms of more favorably ensuring the effects resulting from the use of the lithium-containing composite oxide represented by the general composition formula (1) and having the mentioned sulfur content.

When using the lithium-containing composite oxide represented by the general composition formula (1) and having the mentioned sulfur content in combination with other active material, they may be used in the form of a simple mixture. However, it is more preferable to use them in the form of composite particles obtained by combining particles of these materials through granulation or the like. In this case, the filling density of the active materials in the positive electrode mixture layer improves, so that contact between the active material particles can be further ensured. Consequently, it is possible to further improve the capacity and load characteristics of the nonaqueous secondary battery.

When using composite particles of the lithium-containing composite oxide represented by the general composition formula (1) and having the mentioned sulfur content and other active material as a positive electrode active material, the number average particle size of one of the lithium-containing composite oxide represented by the general composition formula (1) and having the mentioned sulfur content and the other active material is preferably one-half or less of the number average particle size of the other. As in this case, if particles having a large number average particle size (hereinafter referred to as "large particles") and particles having a small number average particle size (hereinafter referred to as "small particles") are combined to form composite particles, the small particles are likely to be dispersed around and fixed to the large particles, so that the composite particles can be formed in a more uniform mixture ratio. This makes it possible to suppress an uneven reaction in the electrode and to further improve the charge-discharge cycle characteristics and safety of the nonaqueous secondary battery When the large particles and the small particles are used to form the composite particles as in the above case, the number average particle size of the large particles is preferably 10 to 30 μm, and the number average particle size of the small particles is preferably 1 to 15 μm.

The above composite particles can be produced as follows. For example, particles of the lithium-containing composite oxide represented by the general composition formula (1) and having the mentioned sulfur content and particles of other active material are mixed using a variety of general kneaders such as a single-screw kneader and a twin-screw kneader, and then the particles are ground under shear to combine them. In view of the productivity of the composite particles, it is preferable to adopt a continuous kneading process for kneading the particles in which the materials are supplied continuously.

It is preferable to further add a binder to the active material particles during the kneading. This allows the shape of the composite particles to be maintained firmly. Further, it is more preferable to also add a conductive assistant during the kneading. This allows a further improvement in the conductivity between the active material particles.

Both thermoplastic and thermosetting resins can be used as a binder added in the production of the composite particles as long as they are chemically stable in the nonaqueous secondary battery. Examples of the binder include: polyethylene; polypropylene; polytetrafluoroethylene (PTFE); polyvinylidene fluoride (PVDF); polyhexafluoropropylene (PHFP); styrene-butadiene rubber; tetrafluoroethylene-hexafluoroethylene copolymer; tetrafluoroethylene-hexafluoropropylene copolymer (FEP); tetrafluoroethylene-perfluoroalkylvinyl ether copolymer (PFA); vinylidene fluoride-hexafluoropropylene copolymer; vinylidene fluoride-chlorotrifluoroethylene copolymer; ethylene-tetrafluoroethylene copolymer (ETFE resin); polychlorotrifluoroethylene (PCTFE); vinylidene fluoride-pentafluoropropylene copolymer; propylene-tetrafluoroethylene copolymer; ethylene-chlorotrifluoroethylene copolymer (ECTFE); vinylidene fluoride-hexafluoropropylene-tetrafluoroethylene copolymer; and vinylidene fluoride-perfluoromethyl vinyl ether-tetrafluoroethylene copolymer, and ethylene-acrylic acid copolymer; ethylene-methacrylic acid copolymer; ethylene-methyl acrylate copolymer; ethylene-methyl methacrylate copolymer; and an Na ion crosslinked body of these copolymers. These materials may be used individually or in combinations of two or more. Among these materials, PVDF, PTFE, and PHFP are preferred in view of the stability in the nonaqueous secondary battery and the characteristics of the nonaqueous secondary battery. These materials may be used in combination or in the form of a copolymer composed of their monomers.

It is preferable that the amount of the binder added in the production of the composite particles is as small as possible as long as the composite particles can be stabilized. For example, the amount of the binder added is preferably 0.03 to 2 parts by mass with respect to 100 parts by mass of all of the active materials.

A conductive assistant added in the production of the composite particles is not particularly limited as long as it is chemically stable in the nonaqueous secondary battery. Examples of the conductive assistant include: graphites such as natural graphite and artificial graphite; carbon blacks such as acetylene black, ketjen black (trade name), channel black, furnace black, lamp black, and thermal black; conductive fibers such as carbon fiber and metal fiber; metal powders such as aluminum powder; fluorocarbon; zinc oxide; conductive whiskers made of potassium titanate and the like; conductive metal oxides such as titanium oxide; and organic conductive materials such as polyphenylene derivative. These materials may be used individually or in combinations of two or more. Among these materials, graphites and carbon blacks are preferred because graphites have high conductivity and carbon blacks have excellent liquid absorbency. Further, the conductive assistant is not limited to the form of primary particles, and can be in the form of an aggregate such as a secondary aggregate or chain structure. The conductive assistant in the form of an aggregate is easier to handle and can improve the productivity.

The amount of the conductive assistant added in the production of the composite particles is not particularly limited as long as the conductivity and the liquid absorbency can be ensured favorably, and is preferably, for example, 0.1 to 2 parts by mass with respect to 100 parts by mass of all of the active materials.

It is preferable that the composite particles have a porosity of 5 to 15%. When the composite particles have such a porosity, the nonaqueous electrolyte can properly come into contact with or permeate through the composite particles.

As with the lithium-containing composite oxide represented by the general composition formula (1) and having the mentioned sulfur content, the composite particles are preferably spherical or substantially spherical in shape. This allows a further increase in the density of the positive electrode mixture layer.

The positive electrode can be produced by, for example, forming a positive electrode mixture layer containing, as positive electrode active materials, the composite particles and the lithium-containing composite oxide represented by the general composition formula (1) and having the mentioned sulfur content on one side or both sides of a current collector.

The positive electrode mixture layer can be formed as follows. For example, the lithium-containing composite oxide represented by the general composition formula (1) and having the mentioned sulfur content, the composite particles, the binder, and the conductive assistant are added to a solvent to prepare a positive electrode mixture-containing composition in the form of a paste or slurry, and this composition is applied onto the surface of a current collector by a variety of coating methods, dried, and further subjected to pressing to adjust the thickness and density of the positive electrode mixture layer.

Here, if a water repellent such as fluororesin or a silane compound is present in the positive electrode mixture layer along with the conductive assistant, boundaries of three phases, i.e., solid, liquid, and vapor phases, are likely to be formed, and gas can be easily absorbed. Consequently, a nonaqueous secondary battery having more favorable storage characteristics and a long life can be formed.

The method for coating the surface of the current collector with the positive electrode mixture-containing composition may be, for example, a substrate lifting method using a doctor blade, a coater method using a die coater, comma coater, knife coater or the like, or a printing method such as screen printing or relief printing.

Examples of the binder and the conductive assistant that can be used in the preparation of the positive electrode mixture-containing composition include the variety of binders and conductive assistants mentioned above as being useable in the production of the composite particles.

It is preferable that the positive electrode mixture layer includes 80 to 99 mass % of the active materials including the lithium-containing composite oxide represented by the general composition formula (1) and having the mentioned sulfur content, 0.5 to 10 mass % of the binder (including the one contained in the composite particles), and 0.5 to 10 mass % of the conductive assistant (including the one contained in the composite particles).

The positive electrode mixture layer has a thickness of preferably 15 to 200 μm per one side of the current collector after the pressing. Furthermore, the positive electrode mixture layer has a density of preferably 3.1 g/cm$^3$ or more, and more preferably 3.52 g/cm$^3$ or more after the pressing. It is possible to further increase the capacity if the electrode is produced to have the positive electrode mixture layer having such a high density. However, if the density of the positive electrode mixture layer is too large, the porosity declines, so that the nonaqueous electrolyte permeability may deteriorate. Therefore, the positive electrode mixture layer has a density of preferably 4.0 g/cm$^3$ or less after the pressing. For the pressing, the positive electrode mixture layer may be roll pressed at a linear pressure of about 1 to 100 kN/cm, for example. Such a process allows the positive electrode mixture layer to have the density as described above.

The density of the positive electrode mixture layer in the context of the present specification is a value measured as follows. The positive electrode is cut into a sample having a certain area, and the mass of the sample is measured by an electronic force balance with a minimum scale of 0.1 mg. Then, the mass of the current collector is subtracted from the mass of the sample, yielding the mass of the positive electrode mixture layer. On the other hand, the total thickness of the positive electrode is measured at 10 points by a micrometer with a minimum scale of 1 μm, and the volume of the positive electrode mixture layer is calculated from the area and the average of the values obtained by subtracting the thickness of the current collector from the measured values. The density of the positive electrode mixture layer is then determined by dividing the mass by the volume of the positive electrode mixture layer.

The material of the positive electrode current collector is not particularly limited as long as it is an electronic conductor chemically stable in the nonaqueous secondary battery formed. Examples of the material include: aluminum or aluminum alloy; stainless steel; nickel; titanium; carbon; a conductive resin; and a composite material obtained by forming a carbon layer or titanium layer on the surface of aluminum, aluminum alloy, or stainless steel. Among these materials, aluminum or aluminum alloy is particularly preferred because they are lightweight and have high electronic conductivity. The positive electrode current collector may be, for example, a foil, film, sheet, net, punching sheet, lath, porous material, foam body, or compact of a fiber group, which are made of the mentioned materials. Moreover, the current collector can also be subjected to a surface treatment to make its surface uneven. The thickness of the current collector is not particularly limited but is generally 1 to 500 μm.

The method for producing the positive electrode of the present invention is not limited to the method described above, and the positive electrode may be produced by other methods. For example, when using the composite particles as an active material, the positive electrode may be obtained by forming the positive electrode mixture layer by directly fixing the composite particles onto the surface of the current collector instead of using the positive electrode mixture-containing composition.

If necessary, the positive and negative electrodes of the present invention may be each provided with a lead formed by a conventional method for electrically connecting the electrode to other members of the nonaqueous secondary battery As long as the nonaqueous secondary battery of the present invention includes the negative and positive electrodes described above, other components and structure are not particularly limited. Thus, components and structures adopted in conventionally-known nonaqueous secondary batteries can be applied to the nonaqueous secondary battery of the present invention.

A separator used in the nonaqueous secondary battery of the present invention is preferably a porous film made of, for example, polyolefin such as polyethylene, polypropylene, or ethylene-propylene copolymer; or polyester such as polyethylene terephthalate or copolymerized polyester. It is preferable that the separator has the property of being able to close its pores (i.e., shutdown function) at 100 to 140° C. For this reason, the separator preferably includes a thermoplastic resin having a melting temperature of 100 to 140° C. as its component. In this case, the melting temperature is measured with a differential scanning calorimeter (DSC) in accordance with the regulations of the Japanese Industrial Standards (JIS) K 7121. The separator is preferably a single-layer porous film including polyethylene as the main component or laminated porous film of two to five polyethylene and polypropylene layers. When mixing polyethylene with a resin having a higher melting point than polyethylene such as polypropylene, or laminating the two resins, polyethylene desirably makes up 30 mass % or more, and more desirably 50 mass % or more of the resins making up the porous film.

For such a resin porous film, for example, a porous film made of any of the thermoplastic resins mentioned above and used in conventionally-known nonaqueous secondary batteries and the like, i.e., an ion-permeable porous film produced by solvent extraction, dry drawing, wet drawing, or the like can be used.

The average pore diameter of the separator is preferably 0.01 μm or more, and more preferably 0.05 μm or more, and is preferably 1 μm or less, and more preferably 0.5 μm or less.

Characteristically, the separator desirably has a Gurley value of 10 to 500 sec. The Gurley value is obtained by a method according to JIS P 8117 and expressed as the length of time (seconds) it takes for 100 ml air to pass through a membrane at a pressure of 0.879 g/mm$^2$. If the air permeability is too large, the ion permeability may deteriorate. On the other hand, if the air permeability is too small, the strength of the separator may decline. Furthermore, it is desirable that the separator has strength of 50 g or more, the strength being piercing strength obtained using a needle having a diameter of 1 mm. When lithium dendrite crystals develop, the dendrite crystals may penetrate the separator and cause a short circuit if the piercing strength is too small.

Even if the internal temperature of the nonaqueous secondary battery rises to 150° C. or higher, the safety of the nonaqueous secondary battery can be ensured because the lithium-containing composite oxide represented by the general composition formula (1) and having the mentioned sulfur content has excellent thermal stability.

For the nonaqueous electrolyte, a solution obtained by dissolving an electrolytic salt in a solvent can be used. Examples of the solvent include aprotic organic solvents such as propylene carbonate (PC), ethylene carbonate (EC), butylene carbonate (BC), dimethyl carbonate (DMC), diethyl carbonate (DEC), methyl ethyl carbonate (MEC), γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric triester, trimethoxymethane, dioxolane derivative, sulfolane, 3-methyl-2-oxazolidinone, propylene carbonate derivative, tetrahydrofuran derivative, diethyl ether, and 1,3-propane sultone. These materials may be used individually or in combinations of two or more. Also, amineimide organic solvents and sulfur- or fluorine-containing organic solvents can be used. Among these materials, a mixed solvent of EC, MEC, and DEC is preferred. In this case, it is more preferable that the DEC content is in a range of 15 vol % to 80 vol % with respect to the total volume of the mixed solvent. By using such a mixed solvent, it is possible to keep the low-temperature characteristics and charge-discharge cycle characteristics of the battery at a high level and to improve the stability of the solvent when the battery is charged at a high voltage.

Preferred examples of the electrolytic salt used in the nonaqueous electrolyte include lithium perchlorate, organoboron lithium salt, salt of fluorine-containing compound such as trifluoromethanesulfonate, and imide salt. Specifically, the electrolytic salt may be, for example, $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 7$), or $LiN(Rf_3OSO_2)_2$ (where Rf represents a fluoroalkyl group). These materials may be used individually or in combination of two or more. Among these materials, for example, $LiPF_6$ and $LiBF_4$ are more preferred because they have favorable charge-discharge characteristics. These fluorine-containing organic lithium salts are easily soluble in the above-mentioned solvents because they are highly anionic and undergo ion separation easily. The concentration of the electrolytic salt in the solvent is not particularly limited, but is generally 0.5 to 1.7 mol/L.

For the purpose of improving the characteristics of the nonaqueous electrolyte such as safety, charge-discharge cycle characteristics, and high-temperature storage characteristics, it is also possible to add additives such as vinylene carbonates, 1,3-propane sultone, diphenyl disulfide, cyclohexylbenzene, biphenyl, fluorobenzene, and t-butylbenzene as needed. When the lithium-containing composite oxide contains Mn and an active material containing Mn is used to form the composite particles, it is particularly preferable to add an additive including a sulfur element because the surface reactivity of the lithium-containing composite oxide and the composite particles can be stabilized.

The nonaqueous secondary battery of the present invention is formed as follows. A stacked electrode body formed by stacking, for example, the positive electrode and the negative electrode via the separator, or wound electrode body formed by winding the stacked electrode body is produced, and then such an electrode body and the nonaqueous electrolyte are sealed in an outer package by a conventional method. As with conventionally-known nonaqueous secondary batteries, the battery may be in the form of a cylindrical battery using a cylindrical (circular or rectangular cylindrical) outer can, a flat battery using a flat outer can (circular or rectangular in a plan view), or a soft package battery using a metal-deposited laminated film as an outer package. A steel or aluminum outer may be used as the outer can.

EXAMPLES

Hereinafter, the present invention will be described in detail by way of Examples. It should be noted that the present invention is not limited to Examples described below. In Examples, the percentage of the lithium-containing composite oxide primary particles having a particle size of 0.7 μm of all of the primary particles and the BET specific surface area were measured by the methods as described above.

Example 1

Production of Negative Electrode

SiO (number average particle size: 5.0 μm) was heated to about 1000° C. in an ebullated bed reactor. 25° C. mixed gas of methane and nitrogen gas was brought into contact with the heated particles to perform CVD at 1000° C. for 60 minutes. The carbon resulting from the thermal decomposition of the mixed gas (hereinafter referred also to as the "CVD carbon") in this way was deposited on the composite particles to form a coating layer, thus obtaining an SiO-carbon material composite (carbon-coated SiO). The SiO was an oxide in which a Si microcrystalline phase was dispersed within the particles.

The composition of the SiO-carbon material composite was calculated from a change in the mass before and after the formation of the coating layer, and the ratio of SiO to CVD carbon was 85:15 (mass ratio).

Next, the SiO-carbon material composite and graphite were used to form a negative electrode precursor sheet. 7 mass % of the carbon-coated SiO (the content relative to the total content of all of the solids, the same applies to the following), 91 mass % of graphite, 1 mass % of CMC and 1 mass % of SBR as binders, and water were mixed with each other to prepare a negative electrode mixture-containing slurry.

With a blade coater, the negative electrode mixture-containing slurry was applied onto both sides of a current collector made of a copper foil and having a thickness of 10 μm. The current collector was then dried at 100° C. and compression molded by a roller press so as to form negative electrode mixture layers each having a thickness of 60 μm. The electrode in which the negative electrode mixture layers were formed on the current collector was dried at 100° C. for 15 hours in a vacuum.

The dried electrode was further heat-treated at 160° C. for 15 hours using a far infrared heater. In the electrode after the heat treatment, the adhesion between the negative electrode mixture layers and the current collector was firm and the negative electrode mixture layers did not come off from the current collector even by cutting and bending.

Then, the electrode was cut into a strip-shaped negative electrode having a width of 54 mm.

<Production of Positive Electrode>

Further, the positive electrode was produced as follows. First, a mixed aqueous solution containing 3.78 mol/dm$^3$ of nickel sulfate, 0.25 mol/dm$^3$ of cobalt sulfate, 0.08 mol/dm$^3$ of manganese sulfate, and 0.08 mol/dm$^3$ of magnesium sulfate in concentration was prepared. Next, ammonia water whose pH had been adjusted to about 12 by addition of sodium hydroxide was placed in a reactor vessel. While stirring the ammonia water strongly, the mixed aqueous solution and 25 mass % concentration ammonia water were dropped into the reaction vessel with a metering pump at 23 cm$^3$/min and 6.6 cm$^3$/min, respectively, to synthesize a coprecipitation compound of Ni, Co, Mn, and Mg (spherical coprecipitation compound). At that time, the temperature of the reaction solution was maintained at 50° C. Further, an aqueous solution having a sodium hydroxide concentration of 3 mol/dm$^3$ was dropped in the reaction vessel at the same time so as to maintain the pH of the reaction solution around 12, and nitrogen gas was further bubbled at a flow rate of 1 dm$^3$/min.

The coprecipitation compound was washed in water, filtered and then dried, thus obtaining a hydroxide. After dispersing the hydroxide, LiOH.H$_2$O and BaSO$_4$ in ethanol in a mole ratio of 1:1:0.01 to form a slurry, the slurry was mixed in a planetary ball mill for 40 minutes, followed by drying at ambient temperature, thus obtaining a mixture. Next, the mixture was put in a melting pot made of alumina and heated to 600° C. in a dry air flow at 2 dm$^3$/min. The temperature was maintained for 2 hours for preheating. Then, the temperature was raised to 900° C. and the mixture was fired for 12 hours, thus synthesizing a lithium-containing composite oxide.

The obtained lithium-containing composite oxide was washed in water, then heat-treated at 700° C. for 12 hours in air (oxygen concentration of about 20 vol %), and pulverized into a powder with a mortar. The pulverized lithium-containing composite oxide was stored in a desiccator.

The composition of the lithium-containing composite oxide was analyzed by the ICP (Inductive Coupled Plasma) method as follows. First, 0.2 g of the lithium-containing composite oxide was taken and put in a 100 ml container. Then, 5 ml of pure water, 2 ml of aqua regia, and 10 ml of pure water were put in the container in order, followed by heating to dissolve the lithium-containing composite oxide. After cooling, the resultant solution was further diluted with pure water by 25 times, and the composition was analyzed by ICP ("ICP-757" manufactured by JARRELL-ASH Co. Ltd.) (calibration curve method). The composition of the lithium-containing composite oxide was derived from the obtained result, and it was found that the lithium-containing composite oxide was represented by the composition $Li_{1.00}Ni_{0.89}Co_{0.06}Mn_{0.02}Mg_{0.02}Ba_{0.00}O_2$ and had a sulfur content of 0.05 mass %.

To analyze the state of the lithium-containing composite oxide, X-ray absorption spectroscopy (XAS) was performed using a BL 4 beam port of "AURORA", a superconducting compact radiation light source manufactured by Sumitomo Electric Industries, Ltd., at the SR center, Ritsumeikan University. Based on the document "Journal of the Electrochemical Society, 146, p. 2799 to 2809 (1999)", analysis software REX available from Rigaku Corporation was used to analyze the obtained data.

First, to determine the average valence of Ni of the lithium-containing composite oxide, NiO and $LiNi_{0.5}Mn_{1.5}O_4$ (standard samples of compounds containing Ni having an average valence of 2) and $LiNi_{0.82}Co_{0.15}Al_{0.03}O_2$ (a standard sample of a compound containing Ni having an average valence of 3) were used to analyze their state in the same manner as in the analysis of the lithium-containing composite oxide, and a regression line representing the relationship between the position of the K absorption edge of Ni and the valence of Ni was created for each standard sample.

The analysis of the state of the lithium-containing composite oxide revealed, from the position of the K absorption edge of Ni and the regression line, that the average valence of Ni was 3.02.

For the average valence of Co of the lithium-containing composite oxide, CoO (a standard sample of a compound containing Co having an average valence of 2), $LiCoO_2$ (a standard sample of a compound containing Co having an average valence of 3) and $Co_3O_4$ (a standard sample of a compound containing Co having an average valence of 3.5) were used to analyze their state in the same manner as in the analysis of the lithium-containing composite oxide, and a regression line representing the relationship between the position of the K absorption edge of Co and the valence of Co was created for each standard sample. And the analysis of the state of the lithium-containing composite oxide revealed, from the position of the K absorption edge of Co and the regression line, that the average valence of Co was 3.02.

Moreover, for the average valence of Mn of the lithium-containing composite oxide, MnO (a standard sample of a compound containing Mn having an average valence of 2), $LiMnO_2$ and $Mn_2O_3$ (standard samples of compounds containing Mn having an average valence of 3), $LiMn_2O_4$ (a standard sample of a compound containing Mn having an average valence of 3.5), and $MnO_2$, $Li_2MnO_3$ and $LiNi_{0.5}Mn_{1.5}O_4$ (standard samples of compounds containing Mn having an average valence of 4) were used to analyze their state in the same manner as in the analysis of the lithium-containing composite oxide, and a regression line representing the relationship between the position of the K absorption edge of Mn and the valence of Mn was created for each standard sample. And the analysis of the state of the lithium-containing composite oxide revealed, from the position of the K absorption edge of Mn and the regression line, that the average valence of Mn was 4.02.

For the average valence of Mg of the lithium-containing composite oxide, MgO and $MgAl_2O_4$ (standard samples of compounds containing Mg having an average valence of 2) and Mg (a standard sample of Mg having an average valence of 0) were used to analyze their state in the same manner as in the analysis of the lithium-containing composite oxide, and a regression line representing the relationship between the position of the K absorption edge of Mg and the valence of Mg was created for each standard sample. And the analysis of the state of the lithium-containing composite oxide revealed, from the position of the K absorption edge of Mg and the regression line, that the average valence of Mg was 2.00.

Furthermore, the lithium-containing composite oxide had a BET specific surface area of 0.23 $m^2/g$, and the primary particles having a particle size of 0.7 μm or less made up 11.7 vol % of all of the primary particles.

96 mass % (the content relative to the total content of all of the solids, the same applies to the following) of the lithium-containing composite oxide as a positive electrode active material, 2 mass % of Ketjen Black as a conductive assistant, 2 mass % of PVDF as a binder, and dehydrated N-methyl-2-pyrrolidone (NMP) were mixed with each other to obtain a positive electrode mixture-containing slurry, and the slurry was applied onto both sides of a current collector made of an aluminum foil and having a thickness of 15 μm. After drying, the current collector was pressed to form positive electrode mixture layers each having a thickness of 70 μm. Thereafter, this was cut into a strip-shaped positive electrode having a width of 55 mm.

<Assembly of Nonaqueous Secondary Battery>

Next, the negative electrode and the positive electrode were stacked via a microporous polyethylene film separator (thickness: 18 μm, porosity 50%), and wound in a rolled shape. Then, a terminal was welded to each of the positive electrode and the negative electrode, the wound electrodes were put in an aluminum alloy outer can having a thickness of 49 mm a width of 42 mm and a height of 61 mm (494261 type), and a cover was attached to the outer can by welding. Thereafter, 3.6 g of a nonaqueous electrolyte was poured into the container through an inlet formed in the cover. The nonaqueous electrolyte was prepared by dissolving $LiPF_6$ in a solution obtained by dissolving 3 mass % of vinylene carbonate in an EC-DEC mixture (EC:DEC=3:7 (volume ratio)) such that $LiPF_6$ made up 1 mol % of the electrolyte. Then, the cover was sealed, thus obtaining a rectangular nonaqueous secondary battery having a structure as shown in FIG. 1 and an appearance as shown in FIG. 2.

Figure 1B:
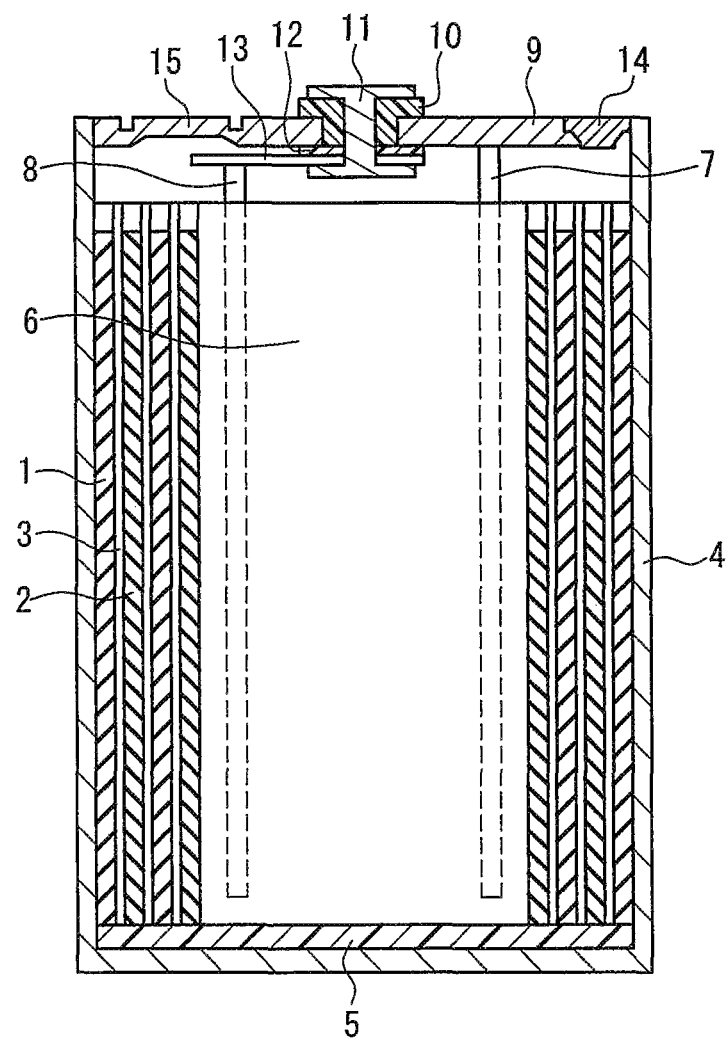
Figure 2:
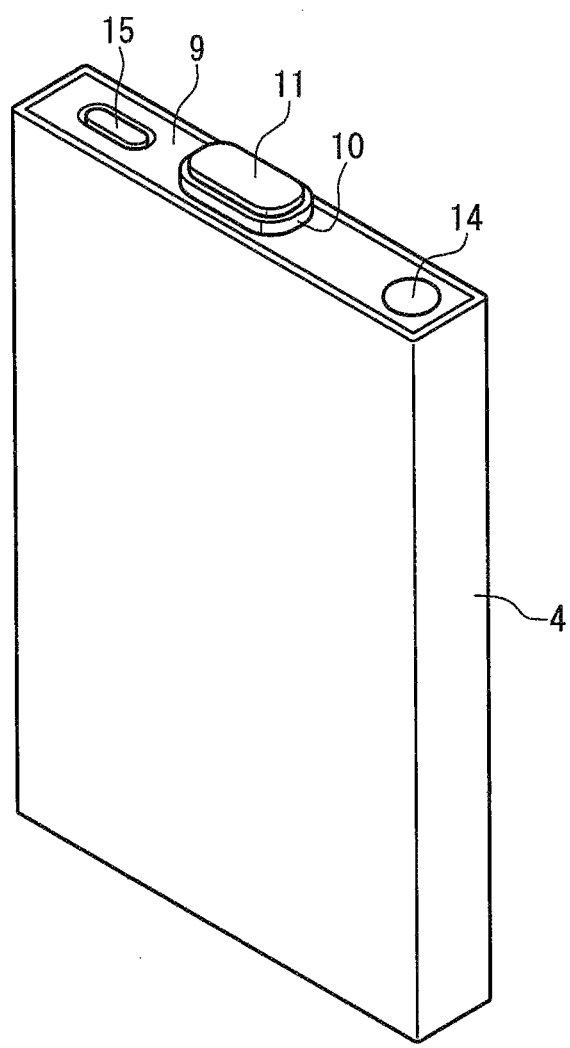
FIG. 2 is an external perspective view of the nonaqueous secondary battery of the present invention.

Hereinafter, the battery as shown in FIGS. 1A, 1B, and 2 will be described. FIG. 1A is a plan view and FIG. 1B is a cross-sectional view of the battery. As shown in FIG. 1B, a positive electrode 1 and a negative electrode 2 are wound in a spiral fashion via a separator 3, and then pressed into a flat shape, thereby providing a flat-shaped wound electrode body 6. The wound electrode body 6, together with a nonaqueous electrolyte, is housed in a rectangular (rectangular cylindrical) outer can 4. For the sake of simplicity, metal foils used as current collectors in the production of the positive electrode 1 and the negative electrode 2, and the nonaqueous electrolyte, and the like are not illustrated in FIG. 1B.

The outer can 4 is made of aluminum alloy, serves as an outer package of the battery, and is also used as a positive terminal. An insulator 5 made of a polyethylene sheet is placed at the bottom of the outer can 4. A positive electrode lead 7 and a negative electrode lead 8 connected to the respective ends of the positive electrode 1 and the negative electrode 2 are drawn from the flat-shaped wound electrode body 6 including the positive electrode 1, the negative electrode 2, and the separator 3. A stainless steel terminal 11 is attached to a cover (sealing cover) 9 via a polypropylene insulating packing 10. The cover 9 is made of aluminum alloy and used to seal the opening of the outer can 4. A stainless steel lead plate 13 is attached to the terminal 11 via an insulator 12.

The cover 9 is inserted in the opening of the outer can 4, and the joint between them is welded to seal the opening, so that the inside of the battery is hermetically sealed. Moreover, in the battery shown in FIGS. 1A and 1B, the cover 9 has an electrolyte inlet 14. The electrolyte inlet 14 is sealed with a sealing member by laser welding or the like. Thus, the sealing properties of the battery are ensured. In the battery shown in FIGS. 1A, 1B, and 2, although the electrolyte inlet 14 is actually composed of the inlet and the sealing member, they are represented by the electrolyte inlet 14 for ease of illustration. The cover 9 has a cleavable vent 15 as a mechanism for discharging the gas contained in the battery to the outside when the temperature of the battery rises.

In the battery of Example 1, the positive electrode lead 7 is directly welded to the cover 9, so that the outer can 4 and the cover 9 can function as a positive terminal. Moreover, the negative electrode lead 8 is welded to the lead plate 13, and thus electrically connected to the terminal 11 via the lead plate 13, so that the terminal 11 can function as a negative terminal. For example, depending on the material of the outer can 4, however, the positive and negative may be reversed.

FIG. 2 is an external perspective view of the battery shown in FIGS. 1A and 1B. FIG. 2 is for showing that the battery is rectangular in shape. Thus, the battery illustrated in FIG. 2 is schematic and particular components of the battery are only shown. Also, FIG. 1B does not show the cross section of the inside of the electrode body and the separator 3 is not cross-hatched.

Example 2

A hydroxide containing Ni, Co, Mn, and Mg, which was synthesized in the same manner as in Example 1, $LiOH \cdot H_2O$, $BaSO_4$ and $Al(OH)_3$ were dispersed in ethanol in a mole ratio of 1:1:0.01:0.01 to obtain a slurry, and then the slurry was mixed in the planetary ball mill for 40 minutes, followed by drying at ambient temperature, thus obtaining a mixture. Except using this mixture, a lithium-containing composite oxide was synthesized in the same manner as in Example 1.

This lithium-containing composite oxide was analyzed by ICP in the same manner as in Example 1. It was found that the lithium-containing composite oxide was represented by the composition $Li_{1.00}Ni_{0.89}Co_{0.05}Mn_{0.02}Mg_{0.02}Ba_{0.01}Al_{0.01}O_2$ and had a sulfur content of 0.04 mass %.

Further, the lithium-containing composite oxide had a BET specific surface area of 0.2 m$^2$/g, and the primary particles having a particle size of 0.7 μm or less made up 10.5 vol % of all of the primary particles.

A 494261-type rectangular nonaqueous secondary battery was produced in the same manner as in Example 1 except that the positive electrode active material was changed to the above lithium-containing composite oxide.

Example 3

A hydroxide containing Ni, Co, Mn, and Mg, which was synthesized in the same manner as in Example 1, $LiOH \cdot H_2O$, $SrSO_4$, and $Al(OH)_3$ were dispersed in ethanol in a mole ratio of 1:1:0.01:0.01 to obtain a slurry, and then the slurry was mixed in the planetary ball mill for 40 minutes, followed by drying at ambient temperature, thus obtaining a mixture. Except using this mixture, a lithium-containing composite oxide was synthesized in the same manner as in Example 1.

This lithium-containing composite oxide was analyzed by ICP in the same manner as in Example 1, and it was found that the lithium-containing composite oxide was represented by the composition $Li_{1.00}Ni_{0.89}Co_{0.05}Mn_{0.02}Mg_{0.02}Sr_{0.01}Al_{0.01}O_2$ and had a sulfur content of 0.03 mass %.

The lithium-containing composite oxide had a BET specific surface area of 0.16 m$^2$/g and the primary particles having a particle size of 0.7 μm or less made up 10.2 vol % of all of the primary particles.

A 494261-type rectangular nonaqueous secondary battery was produced in the same manner as in Example 1 except that the positive electrode active material was changed to the above lithium-containing composite oxide.

Example 4

A hydroxide containing Ni, Co, Mn, and Mg, which was synthesized in the same manner as in Example 1, $LiOH \cdot H_2O$, and $TiO_2$ were dispersed in ethanol in a mole ratio of 1:1:0.02 to obtain a slurry, and then the slurry was mixed in the planetary ball mill for 40 minutes, followed by drying at ambient temperature, thus obtaining a mixture. Except using this mixture, a lithium-containing composite oxide was synthesized in the same manner as in Example 1.

This lithium-containing composite oxide was analyzed by ICP in the same manner as in Example 1, and it was found that the lithium-containing composite oxide was represented by the composition $Li_{1.00}Ni_{0.89}Co_{0.06}Mn_{0.02}Mg_{0.02}Ti_{0.01}O_2$, and had a sulfur content of 0.02 mass %.

The lithium-containing composite oxide had a BET specific surface area of 0.24 m$^2$/g, and the primary particles having a particle size of 0.7 μm or less made up 10.8 vol % of all of the primary particles.

A 494261-type rectangular nonaqueous secondary battery was produced in the same manner as in Example 1 except that the positive electrode active material was changed to the above lithium-containing composite oxide.

Example 5

A hydroxide containing Ni, Co, Mn, and Mg, which was synthesized in the same manner as in Example 1, $LiOH \cdot H_2O$, and $TiS_2$ were dispersed in ethanol in a mole ratio of 1:1:0.02 to obtain a slurry, and then the slurry was mixed in the planetary ball mill for 40 minutes, followed by drying at ambient temperature, thus obtaining a mixture. Except using this mixture, a lithium-containing composite oxide was synthesized in the same manner as in Example 1.

This lithium-containing composite oxide was analyzed by ICP in the same manner as in Example 1, and it was found that the lithium-containing composite oxide was represented by the composition $Li_{1.00}Ni_{0.89}Co_{0.06}Mn_{0.02}Mg_{0.02}Ti_{0.01}O_2$, and had a sulfur content of 0.05 mass %.

The lithium-containing composite oxide had a BET specific surface area of 0.18 m$^2$/g and the primary particles having a particle size of 0.7 μm or less made up 10.3 vol % of all of the primary particles.

A 494261-type rectangular nonaqueous secondary battery was produced in the same manner as in Example 1 except that the positive electrode active material was changed to the above lithium-containing composite oxide.

Example 6

A hydroxide containing Ni, Co, Mn, and Mg, which was synthesized in the same manner as in Example 1, $LiOH \cdot H_2O$, and $ZrO_2$ were dispersed in ethanol in a mole ratio of 1:1:0.02 to obtain a slurry, and then the slurry was mixed in the planetary ball mill for 40 minutes, followed by drying at ambient temperature, thus obtaining a mixture. Except using this mixture, a lithium-containing composite oxide was synthesized in the same manner as in Example 1.

The lithium-containing composite oxide was analyzed by ICP in the same manner as in Example 1, and it was found that the lithium-containing composite oxide was represented by the composition $Li_{1.00}Ni_{0.89}Co_{0.06}Mn_{0.02}Mg_{0.02}Zr_{0.01}O_2$, and had a sulfur content of 0.02 mass %.

The lithium-containing composite oxide had a BET specific surface area of 0.16 m$^2$/g, and the primary particles having a particle size of 0.7 µm or less made up 10 vol % of all of the primary particles.

A 494261-type rectangular nonaqueous secondary battery was produced in the same manner as in Example 1 except that the positive electrode active material was changed to the above lithium-containing composite oxide.

Example 7

The same lithium-containing composited oxide as that synthesized in Example 1 and LiCoO$_2$ were measured such that the mass ratio of the lithium-containing composited oxide to LiCoO$_2$ was 3:7, and they were mixed for 30 minutes using a Henschel mixer. Except changing the positive electrode active material to this mixture, a 494261-type rectangular nonaqueous secondary battery was produced in the same manner as in Example 1.

Example 8

The same lithium-containing composited oxide as that synthesized in Example 2 and LiCoO$_2$ were measured such that the mass ratio of the lithium-containing composited oxide to LiCoO$_2$ was 3:7, and they were mixed for 30 minutes using a Henschel mixer. Except changing the positive electrode active material to this mixture, a 494261-type rectangular nonaqueous secondary battery was produced in the same manner as in Example 1.

Comparative Example 1

A coprecipitation compound was synthesized in the same manner as in Example 1 except that a mixed aqueous solution containing 3.79 mol/dm$^3$ of nickel sulfate and 0.42 mol/dm$^3$ of cobalt sulfate in concentration was used. Except using this coprecipitation compound, a hydroxide containing Ni and Co in a mole ratio of 90:10 was obtained in the same manner as in Example 1. Further, except using 0.196 mol of this hydroxide and 0.204 mol of LiOH.H$_2$HO, a lithium-containing composite oxide was synthesized in the same manner as in Example 1. Furthermore, a 494261-type rectangular nonaqueous secondary battery was produced in the same manner as in Example 1 except that the positive electrode active material was changed to this lithium-containing composite oxide.

Comparative Example 2

A coprecipitation compound was synthesized in the same manner as in Example 1 except that a mixed aqueous solution containing 3.79 mol/dm$^3$ of nickel sulfate, 0.38 mol/dm$^3$ of cobalt sulfate, and 0.04 mol/dm$^3$ of magnesium sulfate in concentration was used. Except using this coprecipitation compound, a hydroxide containing Ni, Co, and Mg in a mole ratio of 90:9:1 was obtained in the same manner as in Example 1. Further, except using 0.196 mol of this hydroxide and 0.204 mol of LiOH.H$_2$O, a lithium-containing composite oxide was synthesized in the same manner as in Example 1. Furthermore, a 494261-type rectangular nonaqueous secondary battery was produced in the same manner as in Example 1 except that the positive electrode active material was changed to this lithium-containing composite oxide.

Comparative Example 3

A coprecipitation compound was synthesized in the same manner as in Example 1 except that a mixed aqueous solution containing 3.79 mol/dm$^3$ of nickel sulfate, 0.21 mol/dm$^3$ of cobalt sulfate, and 0.21 mol/dm$^3$ of manganese sulfate in concentration was used. Except using this coprecipitation compound, a hydroxide containing Ni, Co, and Mn in a mole ratio of 90:5:5 was obtained in the same manner as in Example 1. Further, except using 0.196 mol of this hydroxide and 0.204 mol of LiOH.H$_2$O, a lithium-containing composite oxide was synthesized in the same manner as in Example 1. Furthermore, a 494261-type rectangular nonaqueous secondary battery was produced in the same manner as in Example 1 except that the positive electrode active material was changed to this lithium-containing composite oxide.

Comparative Example 4

A coprecipitation compound was synthesized in the same manner as in Example 1 except that a mixed aqueous solution containing 3.78 mol/dm$^3$ of nickel nitrate, 0.25 mol/dm$^3$ of cobalt nitrate, 0.08 mol/dm$^3$ of manganese nitrate, and 0.08 mol/dm$^3$ of magnesium nitrate in concentration was used. Except using this coprecipitation compound, a hydroxide containing Ni, Co, Mn, and Mg was synthesized in the same manner as in Example 1. This hydroxide, LiOH.H$_2$H$_2$O and BaCO$_3$ were dispersed in ethanol in a mole ratio of 1:1:0.02 to obtain a slurry, and then the slurry was mixed in the planetary ball mill for 40 minutes, followed by drying at ambient temperature, thus obtaining a mixture. Except using this mixture, a lithium-containing composite oxide was synthesized in the same manner as in Example 1.

Further, a 494261-type rectangular nonaqueous secondary battery was produced in the same manner as in Example 1 except that the positive electrode active material was changed to the above lithium-containing composite oxide.

Comparative Example 5

0.196 mol of hydroxide containing Ni, Co, Mn, and Mg in a mole ratio of 90:6:2:2, which was synthesized in the same manner as in Example 1, and 0.204 mol of LiOH.H$_2$O were dispersed in ethanol to obtain a slurry, and then the slurry was mixed in the planetary ball mill for 40 minutes, followed by drying at ambient temperature, thus obtaining a mixture. Next, the mixture was put in a melting pot made of alumina and heated to 600° C. in a dry air flow at 2 dm$^3$/min. The temperature was maintained for 2 hours for preheating. Subsequently, the temperature was raised to 1100° C. and the mixture was fired for 12 hours, thus synthesizing a lithium-containing composite oxide.

Then, a 494261-type rectangular nonaqueous secondary battery was produced in the same manner as in Example 1 except that the positive electrode active material was changed to the above lithium-containing composite oxide.

Comparative Example 6

A positive electrode was produced in the same manner as in Example 1 except that the positive electrode active material was changed entirely to LiCoO$_2$. Further, a negative electrode was produced in the same manner as in Example 1 except using a negative electrode mixture-containing slurry prepared by mixing 98 mass % of graphite, 1 mass % of CMC and 1 mass % of SBR as binders, and water.

Then, a 494261-type rectangular nonaqueous secondary battery was produced in the same manner as in Example 1 except that the above positive and negative electrodes were used.

Table 1 provides the construction of the positive electrode active materials and the negative electrode active materials used in the nonaqueous secondary batteries of Examples 1 to 8 and Comparative Examples 1 to 6. For each of the lithium-containing composite oxides used in the nonaqueous secondary batteries of Examples 1 to 8 and Comparative Examples 1 to 5 as the positive electrode active material besides $LiCoO_2$, Table 2 provides the composition and the sulfur content determined in the same manner as in Example 1 and Table 3 provides the average valence of each of Ni, Co, Mn, and Mg determined in the same manner as in Example 1. Note that the lithium-containing composite oxides in Comparative Examples 1, 2, 4 and 5 had a sulfur content which was less than analytical limits.

TABLE 1

| | Percentage of positive electrode active material (mass %) | | SiO-carbon material composite content in negative electrode active materials (mass %) |
|---|---|---|---|
| | Lithium-containing composite oxide represented by composition formula (1) | $LiCoO_2$ | |
| Ex. 1 | 100 | 0 | 7.1 |
| Ex. 2 | 100 | 0 | 7.1 |
| Ex. 3 | 100 | 0 | 7.1 |
| Ex. 4 | 100 | 0 | 7.1 |
| Ex. 5 | 100 | 0 | 7.1 |
| Ex. 6 | 100 | 0 | 7.1 |
| Ex. 7 | 30 | 70 | 7.1 |
| Ex. 8 | 30 | 70 | 7.1 |
| Comp. Ex. 1 | (100) | 0 | 7.1 |
| Comp. Ex. 2 | (100) | 0 | 7.1 |
| Comp. Ex. 3 | (100) | 0 | 7.1 |
| Comp. Ex. 4 | 100 | 0 | 7.1 |
| Comp. Ex. 5 | 100 | 0 | 7.1 |
| Comp. Ex. 6 | 0 | 100 | 0 |

TABLE 3

| | Average variance of element of lithium-containing composite oxide | | | |
|---|---|---|---|---|
| | Ni | Co | Mn | Mg |
| Ex. 1 | 3.02 | 3.02 | 4.02 | 2.00 |
| Ex. 2 | 3.02 | 3.02 | 4.02 | 2.00 |
| Ex. 3 | 2.98 | 3.02 | 4.02 | 2.01 |
| Ex. 4 | 2.96 | 3.02 | 4.00 | 2.00 |
| Ex. 5 | 2.98 | 3.02 | 4.00 | 2.00 |
| Ex. 6 | 3.02 | 3.02 | 4.02 | 2.00 |
| Ex. 7 | 3.02 | 3.02 | 4.02 | 2.00 |
| Ex. 8 | 3.02 | 3.02 | 4.02 | 2.00 |
| Comp. Ex. 1 | 2.95 | 3.02 | — | — |
| Comp. Ex. 2 | 2.95 | 3.02 | — | 2.01 |
| Comp. Ex. 3 | 2.94 | 3.02 | 4.02 | — |
| Comp. Ex. 4 | 2.92 | 3.00 | 4.00 | 2.00 |
| Comp. Ex. 5 | 2.44 | 2.80 | 4.00 | 2.00 |

The lithium-containing composite oxides not satisfying the general composition formula (1) were used in the nonaqueous secondary batteries of Comparative Examples 1 to 3 as the only positive electrode active material. For the sake of convenience, the amount of these lithium-containing oxides used is provided in parentheses in the sub field "Lithium-containing composite oxide represented by composition formula (1)" of the field "Percentage of positive electrode active material" of Table 1. Further, the field "y" of Table 2 shows y in the general composition formula (1) and the fields a to e represent the percentage (mol %) of each element of the element group M in the general composition formula (1).

Each of the following evaluations was performed on the nonaqueous secondary batteries of Examples 1 to 8 and Comparative Examples 1 to 6. Table 4 provides the results.

<Standard Capacity>

The batteries of Examples 1 to 8 and Comparative Examples 1 to 6 were each stored at 60° C. for 7 hours. Thereafter, each of the batteries was charged at a constant current and a constant voltage (constant current: 900 mA, constant voltage: 4.2 V, total charging time: 5 hours) and discharged at 360 mA until the battery voltage was reduced to 3 V, and this charge and discharge cycle was repeated at 20° C. until the discharged capacity was constant. Next, the batteries were charged at a constant current and a constant voltage (constant current: 900 mA, constant voltage: 4.2 V, and total charging time: 5 hours) and brought to a standstill for 1 hour. Subsequently, each of the batteries was discharged at 360 mA

TABLE 2

| | Composition of lithium-containing composite oxide | | | | | | | | | Sulfur content |
|---|---|---|---|---|---|---|---|---|---|---|
| | Composition formula | y | a | b | c | d | e | c − d | (c − d)/d | (mass %) |
| Ex. 1 | $Li_{1.00}Ni_{0.89}Co_{0.06}Mn_{0.02}Mg_{0.02}Ba_{0.01}O_2$ | 0.00 | 89 | 6 | 2 | 2 | 1 | 0 | 0 | 0.05 |
| Ex. 2 | $Li_{1.00}Ni_{0.89}Co_{0.05}Mn_{0.02}Mg_{0.02}Ba_{0.01}Al_{0.01}O_2$ | 0.00 | 89 | 5 | 2 | 2 | 2 | 0 | 0 | 0.04 |
| Ex. 3 | $Li_{1.00}Ni_{0.89}Co_{0.05}Mn_{0.02}Mg_{0.02}Sr_{0.01}Al_{0.01}O_2$ | 0.00 | 89 | 5 | 2 | 2 | 2 | 0 | 0 | 0.03 |
| Ex. 4 | $Li_{1.00}Ni_{0.89}Co_{0.06}Mn_{0.02}Mg_{0.02}Ti_{0.01}O_2$ | 0.00 | 89 | 6 | 2 | 2 | 1 | 0 | 0 | 0.02 |
| Ex. 5 | $Li_{1.00}Ni_{0.89}Co_{0.06}Mn_{0.02}Mg_{0.02}Ti_{0.01}O_2$ | 0.00 | 89 | 6 | 2 | 2 | 1 | 0 | 0 | 0.05 |
| Ex. 6 | $Li_{1.00}Ni_{0.89}Co_{0.06}Mn_{0.02}Mg_{0.02}Zr_{0.01}O_2$ | 0.00 | 89 | 6 | 2 | 2 | 1 | 0 | 0 | 0.02 |
| Ex. 7 | $Li_{1.00}Ni_{0.89}Co_{0.06}Mn_{0.02}Mg_{0.02}Ba_{0.01}O_2$ | 0.00 | 89 | 6 | 2 | 2 | 1 | 0 | 0 | 0.05 |
| Ex. 8 | $Li_{1.00}Ni_{0.89}Co_{0.05}Mn_{0.02}Mg_{0.02}Ba_{0.01}Al_{0.01}O_2$ | 0.00 | 89 | 5 | 2 | 2 | 2 | 0 | 0 | 0.04 |
| Comp. Ex. 1 | $Li_{1.02}Ni_{0.90}Co_{0.10}O_2$ | 0.02 | 90 | 10 | — | — | — | — | — | <0.01 |
| Comp. Ex. 2 | $Li_{1.03}Ni_{0.90}Co_{0.09}Mg_{0.01}O_2$ | 0.03 | 90 | 9 | — | 1 | — | — | — | <0.01 |
| Comp. Ex. 3 | $Li_{1.04}Ni_{0.90}Co_{0.05}Mn_{0.05}O_2$ | 0.04 | 90 | 5 | 5 | — | — | — | — | 0.02 |
| Comp. Ex. 4 | $Li_{1.00}Ni_{0.89}Co_{0.06}Mn_{0.02}Mg_{0.02}Ba_{0.01}O_2$ | 0.00 | 89 | 6 | 2 | 2 | 1 | 0 | 0 | <0.01 |
| Comp. Ex. 5 | $Li_{0.95}Ni_{0.90}Co_{0.06}Mn_{0.02}Mg_{0.02}O_2$ | −0.05 | 90 | 6 | 2 | 2 | — | 0 | 0 | <0.01 | until the battery voltage reached 2.5 V, and a standard capacity was determined. In calculating the standard capacity, 100 batteries for each example were measured, and the average of the standard capacities was taken as the standard capacity of the battery of each Example and each Comparative Example.

<Charge-Discharge Cycle Characteristics>

The batteries of Examples 1 to 8 and Comparative Examples 1 to 6 were each charged at a constant current and a constant voltage (constant current: 1800 mA, constant voltage: 4.2 V, and total charging time: 2.5 hours) and brought to a standstill for 1 minute. Subsequently, each of the batteries was discharged at 1800 mA until the battery voltage reached 2.5 V. This charge-discharge cycle was repeated and the number of cycles was counted until the discharged capacity was reduced to 80% of the discharged capacity in the first cycle. Thus, the charge cycle characteristics of each of the batteries were evaluated. In calculating the number of cycles for the charge-discharge cycle characteristics, 10 batteries for each example were measured, and the average of the numbers of cycles was taken as the number of cycles of the battery of each Example and each Comparative Example.

<Safety Evaluation>

The batteries of Examples 1 to 8 and Comparative Examples 1 to 6 were each charged at a constant current and a constant voltage (constant current: 900 mA, constant voltage: 4.25 V, and total charging time: 5 hours). Thereafter, each of the batteries was placed in a thermostatic bath and allowed to stand for 2 hours, and then the temperature was raised from 30° C. to 170° C. at a rate of 5° C. per minute. Subsequently, each of the batteries was allowed to stand for 3 hours at 170° C., and the surface temperature of the battery was measured. In this case, the battery was identified as A when the maximum temperature attained was 180° C. or less and was identified as B when the maximum temperature attained was more than 180° C.

TABLE 4

|  | Standard capacity (mAh) | Numbers of cycles | Safety |
|---|---|---|---|
| Ex. 1 | 1861 | 614 | A |
| Ex. 2 | 1841 | 652 | A |
| Ex. 3 | 1822 | 547 | A |
| Ex. 4 | 1865 | 576 | A |
| Ex. 5 | 1870 | 555 | A |
| Ex. 6 | 1815 | 588 | A |
| Ex. 7 | 1750 | 662 | A |
| Ex. 8 | 1734 | 714 | A |
| Comp. Ex. 1 | 1905 | 315 | B |
| Comp. Ex. 2 | 1890 | 399 | B |
| Comp. Ex. 3 | 1853 | 414 | A |
| Comp. Ex. 4 | 1844 | 476 | A |
| Comp. Ex. 5 | 1025 | 125 | B |
| Comp. Ex. 6 | 1499 | 514 | A |

As can be seen from Table 4, the nonaqueous secondary batteries of Examples 1 to 8, each of which included the positive electrode containing the lithium-containing composite oxide having an appropriate composition and an appropriate sulfur content and the negative electrode containing the SiO-carbon material composite and graphite, had high capacity and excellent charge-discharge cycle characteristics and excellent level of safety.

In contrast, the batteries of Comparative Examples 1, 2 and 5, each of which included the positive electrode containing the lithium-containing composite oxide whose composition did not satisfy the general composition formula (1) and having a small sulfur content, had poorer charge-discharge cycle characteristics and poorer level of safety than the batteries of Examples. Further, the battery of Comparative Example 3, which included the positive electrode containing the lithium-containing composite oxide whose composition did not satisfy the general composition formula (1), and the battery of Comparative Example 4, which included the positive electrode containing the lithium-containing composite oxide having a small sulfur content, had poor charge-discharge cycle characteristics.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

INDUSTRIAL APPLICABILITY

Since the nonaqueous secondary battery of the present invention has a high capacity and excellent battery characteristics, it can be used suitably for a variety of applications to which conventionally-known nonaqueous secondary batteries have been applied, including a power source for a small and multifunctional portable device.

DESCRIPTION OF REFERENCE NUMERALS

1 positive electrode
2 negative electrode
3 separator
4 outer can
5 insulator
6 wound electrode body
7 positive electrode lead
8 negative electrode lead
9 sealing cover
10 insulation packing
11 terminal
12 insulator
13 lead plate
14 nonaqueous electrolyte inlet
15 cleavable vent

The invention claimed is:

1. A nonaqueous secondary battery comprising a positive electrode, a negative electrode, a nonaqueous electrolyte, and a separator, wherein the negative electrode includes a negative electrode mixture layer containing, as negative electrode active materials, a graphite carbon material and a material containing Si as a constituent element, the positive electrode includes a positive electrode mixture layer containing, as a positive electrode active material, a lithium-containing composite oxide represented by the following general composition formula (1) and containing sulfur in a range of 0.01 mass % to 0.5 mass %:

$$Li_{1+y}MO_2 \qquad (1)$$

where y satisfies $-0.3 \leq y < 0.3$, M represents a group of five or more elements including Ni, Co, Mn, Mg and at least one of Al, Ba, Sr, Ti and Zr, and when a, b, c and d represent Ni, Co, Mn, and Mg, respectively, in mol % and e represents a total of Al, Ba, Sr, Ti and Zr in mol % of all of the elements making up M, a, b, c, d, and e satisfy $70 \leq a \leq 97$, $0.5 < b < 30$, $0.5 < c < 30$, $0.5 < d < 30$, $-10 < c-d < 10$, $-8 \leq (c-d)/d \leq 8$, and $e < 10$, and wherein of the lithium-containing composite oxide represented by the general composition formula (1) Ni has an average valence of 2.5 to 3.2, Co has an average valence of 2.5 to 3.2, Mn has an average valence of 3.5 to 4.2, and Mg has an average valence of 1.8 to 2.2.

2. The nonaqueous secondary battery according to claim 1, wherein the material containing Si as a constituent element is a material represented by the general composition formula $SiO_x$, where x satisfies $0.5 \leq x \leq 1.5$.

3. The nonaqueous secondary battery according to claim 1, wherein the positive electrode further contains a lithium cobalt oxide as a positive electrode active material.

4. The nonaqueous secondary battery according to claim 1, wherein the material containing Si as a constituent element is a composite combined with a carbon material.

5. The nonaqueous secondary battery according to claim 4, wherein the composite makes up 0.01 to 20 mass % of the negative electrode active materials.

6. The nonaqueous secondary battery according to claim 4, wherein the amount of the carbon material contained in the composite is in a range of 5 to 50 parts by mass with respect to 100 parts by mass of the material containing Si as a constituent element.

7. The nonaqueous secondary battery according to claim 2, wherein the material represented by the general composition formula $SiO_x$ includes an Si microcrystalline phase or Si amorphous phase.

* * * * *